US012333391B2

(12) United States Patent
Bai et al.

(10) Patent No.: US 12,333,391 B2
(45) Date of Patent: *Jun. 17, 2025

(54) SIDELINK-SUPPORTED FEDERATED LEARNING FOR TRAINING A MACHINE LEARNING COMPONENT

(71) Applicant: QUALCOMM Incorporated, San Diego, CA (US)

(72) Inventors: Tianyang Bai, Somerville, NJ (US); Hua Wang, Basking Ridge, NJ (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1178 days.

This patent is subject to a terminal disclaimer.

(21) Appl. No.: 17/160,697

(22) Filed: Jan. 28, 2021

(65) Prior Publication Data

US 2022/0237507 A1 Jul. 28, 2022

(51) Int. Cl.
*G06N 20/00* (2019.01)
*H04W 72/21* (2023.01)
*H04W 72/51* (2023.01)

(52) U.S. Cl.
CPC ............ *G06N 20/00* (2019.01); *H04W 72/21* (2023.01); *H04W 72/51* (2023.01)

(58) Field of Classification Search
CPC ....... G06N 20/00; H04W 72/51; H04W 72/21
See application file for complete search history.

(56) References Cited

U.S. PATENT DOCUMENTS

| | | | | |
|---|---|---|---|---|
| 2018/0027475 A1* | 1/2018 | Li | ........................... | H04W 76/14 455/426.1 |
| 2019/0220703 A1* | 7/2019 | Prakash | .................. | G06V 10/95 |
| 2020/0358599 A1* | 11/2020 | Baracaldo Angel | ........................ | G06F 21/6227 |
| 2021/0012196 A1* | 1/2021 | Lalitha | ...................... | G06N 7/01 |
| 2021/0168769 A1* | 6/2021 | Hahn | ................ | H04W 72/0446 |
| 2021/0314004 A1* | 10/2021 | Kim | .................... | H03M 13/1111 |
| 2023/0259789 A1* | 8/2023 | Wang | ..................... | G06N 3/045 706/25 |
| 2023/0325679 A1* | 10/2023 | Wang | ..................... | G06N 3/045 706/25 |
| 2023/0342669 A1* | 10/2023 | Shao | ........................ | H04L 9/008 |
| 2024/0028961 A1* | 1/2024 | Ali | ......................... | H04L 41/145 |

FOREIGN PATENT DOCUMENTS

WO WO-2020122669 A1 * 6/2020 ............. G06N 20/00

OTHER PUBLICATIONS

International Search Report and Written Opinion—PCT/US2021/073139—ISA/EPO—Apr. 25, 2022.

* cited by examiner

*Primary Examiner* — Casey R. Garner
(74) *Attorney, Agent, or Firm* — Harrity & Harrity, LLP

(57) ABSTRACT

Various aspects of the present disclosure generally relate to wireless communication. In some aspects, a first user equipment (UE) may receive, from a second UE, a sidelink communication that indicates a first subset of local training data of a set of local training data associated with the second UE. The UE may transmit a combined local update that is based at least in part on training a machine learning component based at least in part on the first subset of local training data and a second set of local training data associated with the first UE. Numerous other aspects are described.

30 Claims, 14 Drawing Sheets

SIDELINK-SUPPORTED FEDERATED LEARNING FOR TRAINING A MACHINE LEARNING COMPONENT

FIELD OF THE DISCLOSURE

Aspects of the present disclosure generally relate to wireless communication and to techniques and apparatuses for sidelink-supported federated learning for training a machine learning component.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a first user equipment (UE) for wireless communication includes a memory; and one or more processors operatively coupled to the memory, the memory and the one or more processors configured to: receive, from a second UE, a sidelink communication that indicates a first subset of local training data of a set of local training data associated with the second UE; and transmit a combined local update that is based at least in part on training a machine learning component based at least in part on the first subset of local training data and a second set of local training data associated with the first UE.

In some aspects, a first UE for wireless communication includes a memory; and one or more processors operatively coupled to the memory, the memory and the one or more processors configured to receive a machine learning component; and transmit, to a second UE, a sidelink communication that indicates a first subset of local training data of a set of local training data associated with the first UE.

In some aspects, a base station for wireless communication includes a memory and one or more processors operatively coupled to the memory, the memory and the one or more processors configured to receive, from a first UE, a federated learning report that indicates one or more parameters associated with a federated learning procedure for training a machine learning component; and transmit, to a second UE, a request to acquire local update assistance from the first UE.

In some aspects, a base station for wireless communication includes a memory and one or more processors operatively coupled to the memory, the memory and the one or more processors configured to: receive, from a first UE, a transfer approval request associated with transferring, to a second UE, a subset of local training data associated with the first UE for training a machine learning component based at least in part on a federated learning procedure; and transmit, to the first UE, a transfer approval indication.

In some aspects, a method of wireless communication performed by a first UE includes receiving, from a second UE, a sidelink communication that indicates a first subset of local training data of a set of local training data associated with the second UE; and transmitting a combined local update that is based at least in part on training a machine learning component based at least in part on the first subset of local training data and a second set of local training data associated with the first UE.

In some aspects, a method of wireless communication performed by a first UE includes receiving a machine learning component; and transmitting, to a second UE, a sidelink communication that indicates a first subset of local training data of a set of local training data associated with the first UE.

In some aspects, a method of wireless communication performed by a base station includes receiving, from a first UE, a federated learning report that indicates one or more parameters associated with a federated learning procedure for training a machine learning component; and transmitting, to a second UE, a request to acquire local update assistance from the first UE.

In some aspects, a method of wireless communication performed by a base station includes receiving, from a first UE, a transfer approval request associated with transferring, to a second UE, a subset of local training data associated with the first UE for training a machine learning component based at least in part on a federated learning procedure; and transmitting, to the first UE, a transfer approval indication.

In some aspects, a non-transitory computer-readable medium storing a set of instructions for wireless communication includes one or more instructions that, when executed by one or more processors of a first UE, cause the UE to: receive, from a second UE, a sidelink communication that indicates a first subset of local training data of a set of local training data associated with the second UE; and transmit a combined local update that is based at least in part on training a machine learning component based at least in part on the first subset of local training data and a second set of local training data associated with the first UE.

In some aspects, a non-transitory computer-readable medium storing a set of instructions for wireless communication includes one or more instructions that, when executed by one or more processors of an UE, cause the UE to: receive a machine learning component; and transmit, to a second UE, a sidelink communication that indicates a first subset of local training data of a set of local training data associated with the first UE.

In some aspects, a non-transitory computer-readable medium storing a set of instructions for wireless communication includes one or more instructions that, when executed by one or more processors of a base station, cause the base station to: receive, from a first UE, a federated learning report that indicates one or more parameters associated with a federated learning procedure for training a machine learning component; and transmit, to a second UE, a request to acquire local update assistance from the first UE.

In some aspects, a non-transitory computer-readable medium storing a set of instructions for wireless communication includes one or more instructions that, when executed by one or more processors of a base station, cause the base station to: receive, from a first UE, a transfer approval request associated with transferring, to a second UE, a subset of local training data associated with the first UE for training a machine learning component based at least in part on a federated learning procedure; and transmit, to the first UE, a transfer approval indication.

In some aspects, an apparatus for wireless communication includes means for receiving, from a second apparatus, a sidelink communication that indicates a first subset of local training data of a set of local training data associated with the second apparatus; and means for transmitting a combined local update that is based at least in part on training a machine learning component based at least in part on the first subset of local training data and a second set of local training data associated with the first apparatus.

In some aspects, an apparatus for wireless communication includes means for receiving a machine learning component; and means for transmitting, to a second apparatus, a sidelink communication that indicates a first subset of local training data of a set of local training data associated with the first apparatus.

In some aspects, an apparatus for wireless communication includes means for receiving, from a first UE, a federated learning report that indicates one or more parameters associated with a federated learning procedure for training a machine learning component; and means for transmitting, to a second UE, a request to acquire local update assistance from the first UE.

In some aspects, an apparatus for wireless communication includes means for receiving, from a first UE, a transfer approval request associated with transferring, to a second UE, a subset of local training data associated with the first UE for training a machine learning component based at least in part on a federated learning procedure; and means for transmitting, to the first UE, a transfer approval indication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
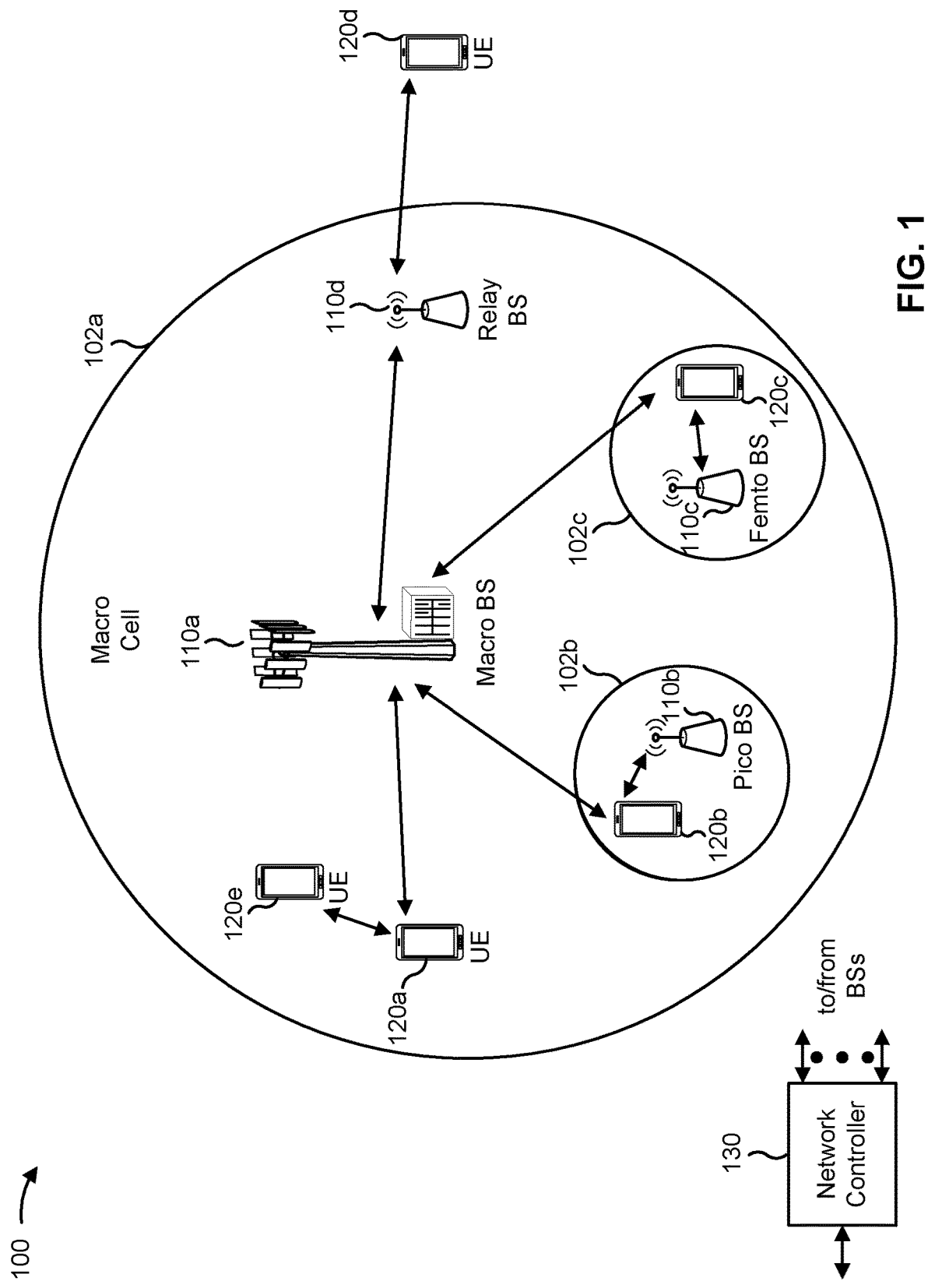
FIG. 1 is a diagram illustrating an example of a wireless network, in accordance with the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
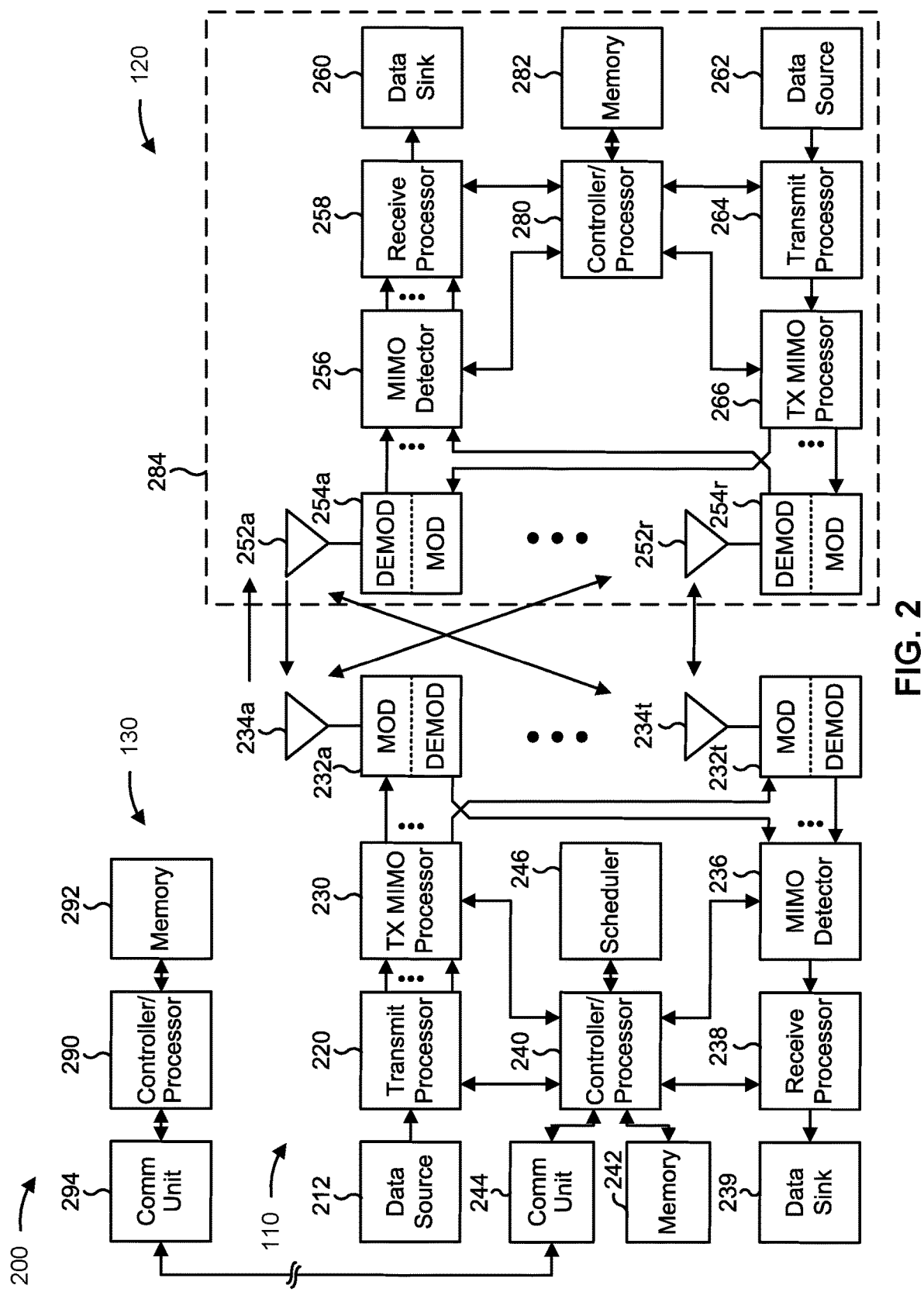
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T>1 and R>1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 6-12.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 6-12.

Controller/processor 240 of base station 110, controller/processor 280 of UE 120, and/or any other component(s) of FIG. 2 may perform one or more techniques associated with sidelink-supported federated learning for training a machine learning component, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, process 1100 of FIG. 11, process 1200 of FIG. 12, and/or other processes as described herein. In some aspects, executing instructions may include running the instructions, converting the instructions, compiling the instructions, and/or interpreting the instructions, among other examples.

In some aspects, the first UE includes means for receiving, from a second UE, a sidelink communication that indicates a first subset of local training data of a set of local training data associated with the second UE; or means for transmitting a combined local update that is based at least in part on training a machine learning component based at least in part on the first subset of local training data and a second set of local training data associated with the first UE. The means for the first UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first UE includes means for determining the combined local update by training the machine learning component based at least in part on a combined local training data set that includes the first subset of local training data and the second set of local training data.

In some aspects, the first UE includes means for determining a first local update by training the machine learning component based at least in part on the first subset of local training data; means for determining a second local update by training the machine learning component based at least in part on the second set of local training data; or means for determining the combined local update based at least in part on combining the first local update with the second local update.

In some aspects, the first UE includes means for determining the combined local update based at least in part on the set of encrypted data, without decrypting the encrypted data.

In some aspects, the first UE includes means for transmitting, to a base station, a federated learning report that indicates one or more parameters associated with federated learning.

In some aspects, the first UE includes means for receiving a request for local update assistance; or means for transmitting an assistance approval, wherein receiving the sidelink communication comprises receiving the sidelink communication based at least in part on transmitting the assistance approval.

In some aspects, the first UE includes means for receiving a machine learning component; or means for transmitting, to a second UE, a sidelink communication that indicates a first subset of local training data of a set of local training data associated with the first UE. The means for the first UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first UE includes means for receiving, from a base station, an indication of a base station approval associated with a transmission of the first subset of local training data.

In some aspects, the first UE includes means for encrypting the first subset of local training data to generate a set of encrypted data, wherein the sidelink communication comprises a set of encrypted data indicating the first subset of local training data.

In some aspects, the first UE includes means for receiving, from a base station, an encryption configuration, wherein encrypting the first subset of local training data comprises encrypting the first subset of local training data based at least in part on the encryption configuration.

In some aspects, the first UE includes means for transmitting, to a base station, a federated learning report that indicates one or more parameters associated with federated learning; or means for receiving, from the base station and based at least in part on the federated learning report, a request to acquire local update assistance.

In some aspects, the first UE includes means for receiving, from a base station, a request for the first UE to establish a sidelink connection with the second UE.

In some aspects, the first UE includes means for receiving, from a base station, a sidelink configuration that indicates one or more sidelink resources to be used for the sidelink communication.

In some aspects, the first UE includes means for transmitting, to a base station, a data transfer completion indication.

In some aspects, the first UE includes means for transmitting, to a base station, a request to acquire local update assistance.

In some aspects, the base station includes means for receiving, from a first UE, a federated learning report that indicates one or more parameters associated with a federated learning procedure for training a machine learning component; or means for transmitting, to a second UE, a request to acquire local update assistance from the first UE. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for transmitting, to the first UE, a request for local update assistance.

In some aspects, the base station includes means for receiving, from a first UE, a transfer approval request associated with transferring, to a second UE, a subset of local training data associated with the first UE for training a machine learning component based at least in part on a federated learning procedure; or means for transmitting, to the first UE, a transfer approval indication. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for transmitting, to the first UE, an encryption configuration.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
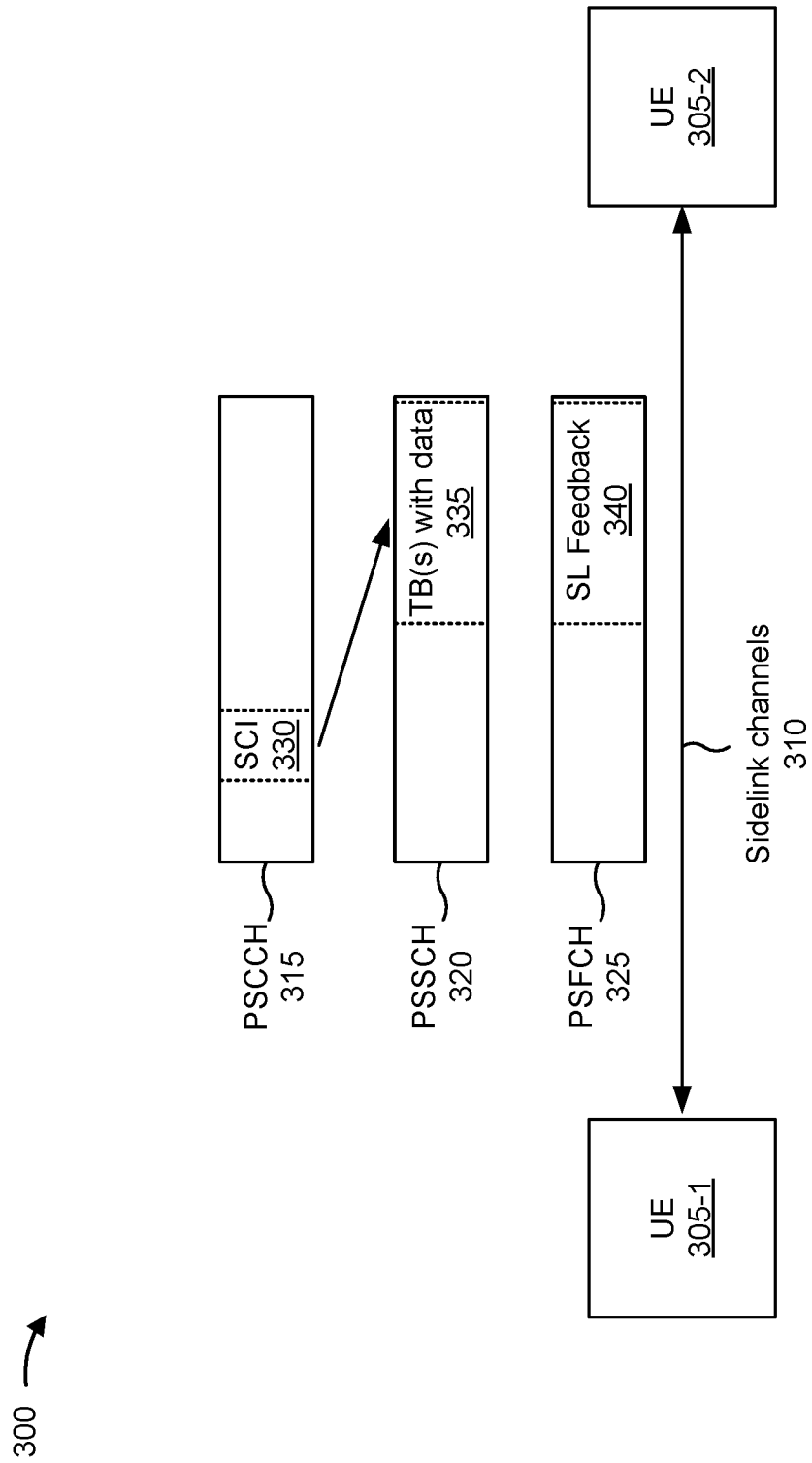
FIG. 3 is a diagram illustrating an example of sidelink communications, in accordance with the present disclosure.

FIG. 3 is a diagram illustrating an example 300 of sidelink communications, in accordance with various aspects of the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
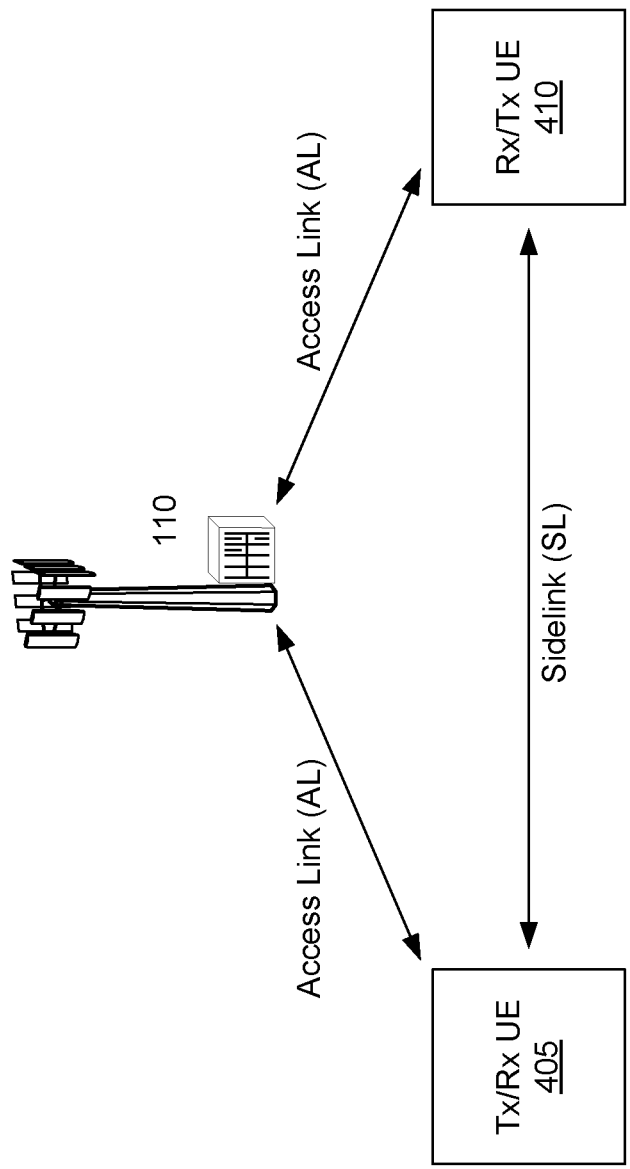
FIG. 4 is a diagram illustrating an example of sidelink communications and access link communications, in accordance with the present disclosure.

FIG. 4 is a diagram illustrating an example 400 of sidelink communications and access link communications, in accordance with various aspects of the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
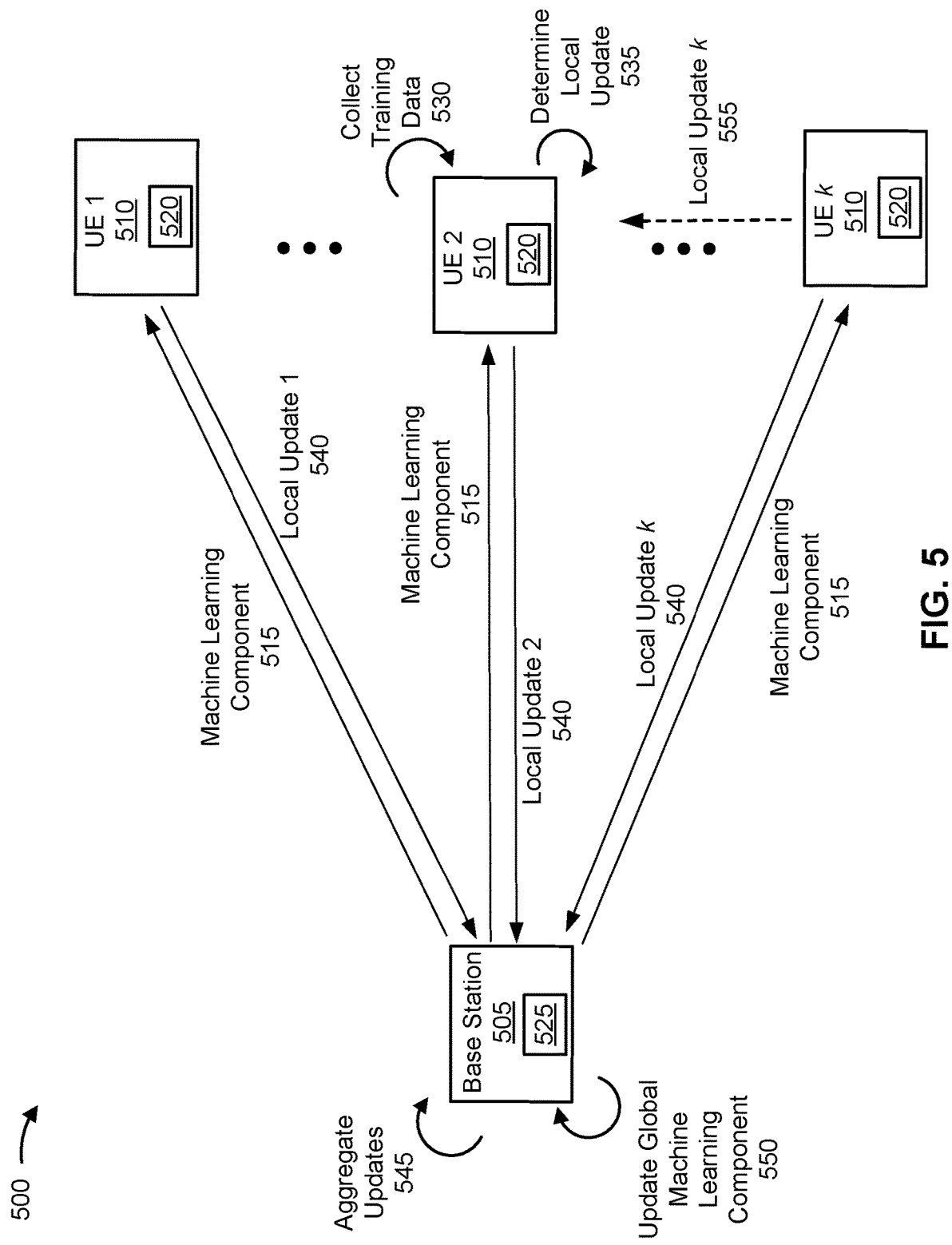
FIG. 5 is a diagram illustrating an example of federated learning for machine learning components, in accordance with the present disclosure.

FIG. 5 is a diagram illustrating an example 500 associated with federated learning for machine learning components, in accordance with various aspects of the present disclosure. As shown, a base station 505 may communicate with a set of K UEs 510 (shown as "UE 1, UE 2, . . . , and UE k"). The base station 505 and the UEs 510 may communicate with one another via a wireless network (e.g., the wireless network 100 shown in FIG. 1). In some aspects, any number of additional UEs 510 may be included in the set of K UEs 510. In some aspects, one or more UEs 510 may communicate with one or more other UEs 510 via a sidelink connection.

As shown by reference number 515, the base station 505 may transmit a machine learning component to the UE 1, the UE 2, and the UE k. As shown, the UEs 510 may include a first communication manager 520, which may be, or be similar to, the first communication manager 140 shown in FIG. 1. The first communication manager 520 may be configured to utilize the machine learning component to perform one or more wireless communication tasks and/or one or more user interface tasks. The first communication manager 520 may be configured to utilize any number of additional machine learning components.

As shown in FIG. 5, the base station 505 may include a second communication manager 525, which may be, or be similar to, the second communication manager 150 shown in FIG. 1. The second communication manager 525 may be configured to utilize a global machine learning component to perform one or more wireless communication tasks, to perform one or more user interface tasks, and/or to facilitate federated learning associated with the machine learning component.

The UEs 510 may locally train the machine learning component using training data collected by the UEs, respectively. A UE 510 may train a machine learning component such as a neural network by optimizing a set of model parameters, $w^{(n)}$, associated with the machine learning component, where n is the federated learning round index. The set of UEs 510 may be configured to provide updates to the base station 505 multiple times (e.g., periodically, on demand, upon updating a local machine learning component, etc.).

A federated learning round refers to the training done by a UE 510 that corresponds to an update provided by the UE 510 to the base station 505. In some aspects, "federated learning round" may refer to the transmission by a UE 510, and the reception by the base station 505, of an update. The federated learning round index n indicates the number of the rounds since the last global update was transmitted by the base station 505 to the UE 510. The initial provisioning of a machine learning component on a UE 510, the transmission of a global update to the machine learning component to a UE 510, and/or the like may trigger the beginning of a new round of federated learning.

In some aspects, for example, the first communication manager 520 of the UE 510 may determine an update corresponding to the machine learning component by training the machine learning component. In some aspects, as shown by reference number 530, the UEs 510 may collect training data and store it in a memory device. The stored training data may be referred to as a "local dataset." As shown by reference number 535, the UEs 510 may determine a local update associated with the machine learning component.

In some aspects, for example, the first communication manager 520 may access training data from the memory device and use the training data to determine an input vector, $x_j$, to be input into the machine learning component to generate a training output, $y_j$, from the machine learning component. The input vector $x_j$ may include an array of input values and the training output $y_j$ may include a value (e.g., a value between 0 and 9).

The training output $y_j$ may be used to facilitate determining the model parameters $w^{(n)}$ that maximize a variational lower bound function. A negative variational lower bound function, which is the negative of the variational lower bound function, may correspond to a local loss function, $F_k(W)$, which may be expressed as:

$$F_k(w)=1/|D_k|\Sigma_{(x_j,y_j)\in D_k}f(w,x_j,y_j)$$

where $|D_k|$ is the size of the local dataset $D_k$ associated with the UE k. A stochastic gradient descent (SGD) algorithm may be used to optimize the model parameters $w^{(n)}$.

The first communication manager 520 may perform one or more SGD procedures to determine the optimized parameters $w^{(n)}$ and may determine the gradients, $g_k^{(n)}=\nabla F_k(w^{(n)})$, of the loss function $F(w)$. The first communication manager 520 may further refine the machine learning component based at least in part on the loss function value, the gradients, and/or the like.

By repeating this process of training the machine learning component to determine the gradients $g_k^{(n)}$ a number of times, the first communication manager 520 may determine an update corresponding to the machine learning component. Each repetition of the training procedure described above may be referred to as an epoch. In some aspects, the update may include an updated set of model parameters $w^{(n)}$, a difference between the updated set of model parameters $w^{(n)}$ and a prior set of model parameters $w^{(n-1)}$, the set of gradients $g_k^{(n)}$, an updated machine learning component (e.g., an updated neural network model), and/or the like.

As shown by reference number 540, the UEs 510 may transmit their respective local updates (shown as "local update 1, local update 2, . . . , local update k"). In some aspects, the local update may include a compressed version of a local update. For example, in some aspects, a UE 510 may transmit a compressed set of gradients, $g_k^{(n)}=q(g_k^{(n)})$, where q represents a compression scheme applied to the set of gradients $g_k^{(n)}$.

A "round" may refer to the process of generating a local update and providing the local update to the base station 505. In some aspects, a "round" may refer to the training, generation and uploading of local updates by all of the UEs in a set of UEs participating in a federated learning procedure. The round may include the procedure described below in which the base station 505 aggregates the local updates and determines a global update based at least in part on the aggregated local updates. In some aspects, the round may include transmitting the global update to the UEs 510. In aspects, a round may include any number of epochs performed by one or more UEs 510.

As shown by reference number 545, the base station 505 (e.g., using the second communication manager 525) may aggregate the updates received from the UEs 510. For example, the second communication manager 525 may average the received gradients to determine an aggregated update, which may be expressed as $$g^{(n)} = \frac{1}{K}\sum_{k=1}^{K} g_k^{(n)},$$

where, as explained above, K is the total number of UEs 510 from which updates were received. In some examples, the second communication manager 525 may aggregate the received updates using any number of other aggregation techniques. As shown by reference number 550, the second communication manager 525 may update the global machine learning component based on the aggregated updates. In some aspects, for example, the second communication manager 525 may update the global machine learning component by normalizing the local datasets by treating each dataset size, IN, as being equal. The second communication manager 525 may update the global machine learning component using multiple rounds of updates from the UEs 510 until a global loss function is minimized. The global loss function may be given, for example, by:

$$F(w) = \frac{\sum_{k=1}^{K}\sum_{j\in D_k} f_j(w)}{K*D} = \frac{1}{K}\sum_{k=1}^{K} F_k(w),$$

where $|D_k|=D$, and where D is a normalized constant. In some aspects, the base station 505 may transmit an update associated with the updated global machine learning component to the UEs 510.

As explained above, updating the global machine learning component includes aggregating local updates from a number of UEs. However, leveraging sidelink communications between UEs to facilitate local update aggregation and/or transmission to the base station may enable positive impacts in network performance. In some cases, as shown by reference number 555, a UE k 510 may transmit the local update k that it generates to another UE 2 510. The UE 2 510 may generate an aggregated local update by aggregating the local update k and a local update determined by the UE 2 510. In some cases, the UE 2 510 may transmit the aggregated local update to another UE 510 (e.g., UE 1), which may aggregate the aggregated local update with a local update generated by that UE 510 to generate an additional aggregated local update. The additional aggregated local update may be transmitted to the base station 505 and/or another UE 510.

However, in some cases, a UE may not have enough processing capacity, capability, memory, and/or power available to determine a local update in a manner that satisfies one or more specified performance criteria. In some cases, for example, it may take two or more UEs of a federated learning system different amounts of time to train a machine learning component during a federated learning round. For example, different UEs may collect different amounts of local training data (e.g., due to differences in user interactions with a related feature), computation capabilities, and/or computation availabilities, among other examples. In that case, the speed of updating the machine learning component may be limited by the slowest UE.

Aspects of techniques and apparatuses described herein may facilitate sidelink-supported federated learning. In some aspects, a first UE may collect a set of local training data and may transfer a first subset of that set of local training data to a second UE. The second UE may determine a combined local update based at least in part on the first subset of local training data and a second set of local training data collected by the second UE. In this way, one or more UEs 510 may assist in determining local updates, thereby offloading processing from a UE that is incapable of performing the processing in accordance with one or more performance criteria. Privacy of the transferred data may be maintained based at least in part on an approval from the base station and/or using encryption. As a result, aspects of the techniques and apparatuses described herein may result in positive impacts on network performance.

As indicated above, FIG. 5 is provided merely as an example. Other examples may differ from what is described with regard to FIG. 5.

Figure 6:
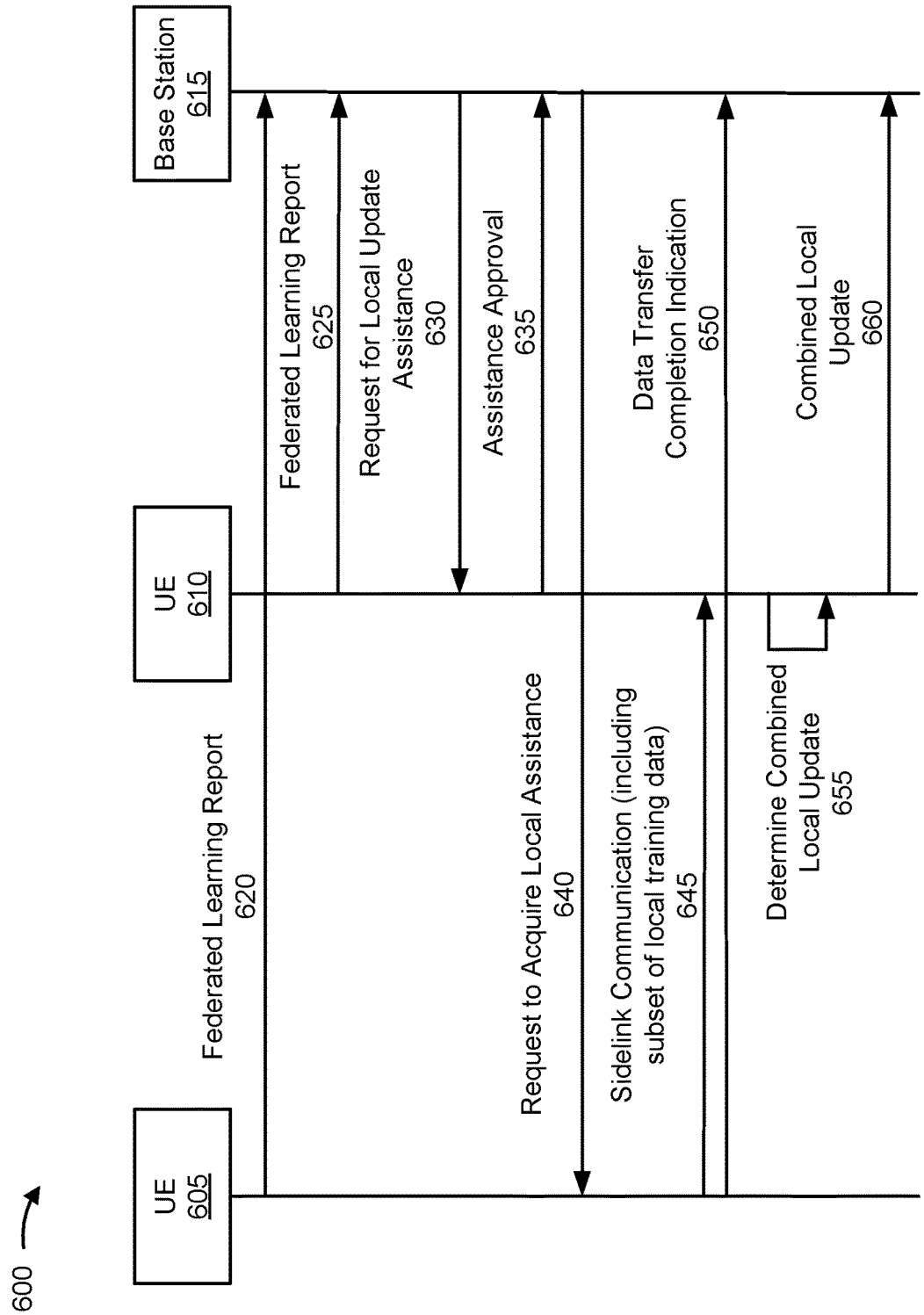
FIGS. 6-8 are diagrams illustrating examples associated with sidelink-supported federated learning for training a machine learning component, in accordance with the present disclosure.

FIG. 6 is a diagram illustrating an example 600 associated with sidelink-supported federated learning for training a machine learning component, in accordance with the present disclosure. As shown, a UE 605, a UE 610, and a base station 615 may communicate with one another. In some aspects, the UE 605 and/or the UE 610 may be, be similar to, include, or be included in one or more of the UEs 510 shown in FIG. 5. In some aspects, the base station 615 may be, be similar to, include, or be included in the base station 505 shown in FIG. 5. In some aspects, the UEs 605 and 610 may communicate with one another via a sidelink connection. The UEs 605 and/or 610 may communicate with the base station 615 via an access link.

As shown by reference number 620, the UE 605 may transmit, and the base station 615 may receive, a federated learning report. As shown by reference number 625, the UE 610 may transmit, and the base station 615 may receive, a federated learning report. A federated learning report may indicate one or more parameters associated with federated learning that correspond to the device sending the federated learning report. For example, in some aspects, the federated learning report transmitted by the UE 605 may indicate at least one of a UE capability of the UE 605, a training progress associated with training the machine learning component, and/or a power status of the UE 605, among other examples.

As shown by reference number 630, the base station 615 may initiate a sidelink-assisted federated learning procedure as described herein by transmitting, to the UE 610, a request for local update assistance. In some aspects, for example, the base station 615 may determine, based at least in part on the federated learning report provided by the UE 605, that the UE 605 does not have enough processing capacity, power capacity, and/or memory to determine a local update, to determine a local update within a specified amount of time, and/or to determine a local update in accordance with some other specified criterion. In some aspects, the UE 605 may have started training the machine learning component, and the base station 615 may determine, based at least in part on an indication of the training progress reported in the federated learning report, that the UE 605 is not making progress fast enough. Based at least in part on one or more of these determinations, the base station 615 may determine that the UE 605 should transfer its local training data to another UE that is capable of performing the training to determine a corresponding local update within the one or more specified performance criteria.

In some aspects, the base station 615 may select the UE 610 from among a set of participating UEs. The set of participating UEs may include one or more UEs that are participating in a federated learning round or rounds. The base station 615 may select the UE 610 based at least in part on the federated learning report received from the UE 610. For example, the base station 615 may select the UE 610 based at least in part on determining that the UE 610 includes enough processing capacity, capability, memory, and/or power to determine a combined local update in a manner that satisfies the specified performance criteria. In some aspects, the base station 615 may determine that the UE 610 also has a sidelink status that satisfies one or more criteria associated with sidelink status. For example, the one or more criteria may correspond to connection to a sidelink network, an ability to connect to a sidelink network, and/or availability of sidelink resources that may be allocated to a particular UE and/or transmission, among other examples.

As shown by reference number 635, the UE 610 may transmit, and the base station 615 may receive, an assistance approval. In some aspects, the assistance approval may be indicated using a hybrid automatic repeat request acknowledgment (HARQ ACK) transmission. In some aspects, the assistance approval may be indicated using uplink control information (UCI), a medium access control control element (MAC CE), and/or any other type of signaling available for transmitting the approval to the base station 615.

As shown by reference number 640, the base station 615 may transmit, and the UE 605 may receive, a request to acquire local assistance. The request to acquire local assistance may indicate, to the UE 605, that the UE 605 is to transfer a subset of local training data of a set of local training data stored at the UE 605 to another UE. In some aspects, the request to acquire local assistance may indicate the UE 610 (e.g., by including an identifier that identifies the UE 610). In some aspects, the base station 615 may transmit, and the UE 605 may receive, a sidelink configuration that indicates one or more sidelink resources to be used for the sidelink communication to transfer the subset of local training data. In some aspects, the request to acquire local assistance may include the sidelink configuration. In some aspects, the UE 605 may determine and/or reserve sidelink resources for the sidelink transmission. In some aspects, the one or more sidelink resources may include at least one of an aperiodic resource, a periodic resource, or a semi-persistent resource.

As shown by reference number 645, the UE 605 may transmit, and the UE 610 may receive, a sidelink communication. The sidelink communication may be transmitted based at least in part on the sidelink configuration and/or sidelink resource reservation. In some aspects, the sidelink communication may be carried on at least one of a physical sidelink control channel (PSCCH), a physical sidelink shared channel (PSSCH), or a combination thereof. The sidelink communication may indicate a first subset of local training data of a set of local training data associated with the UE 605. In some aspects, the sidelink communication may indicate an encrypted first subset of local training data.

In some aspects, the sidelink communication may indicate a set of intermediate results of a local update determination generated by the UE 605. The sidelink communication may indicate a number of training iterations corresponding to the set of intermediate results. In this way, the UE 610 may be able to finish training the machine learning component by starting, with respect to the first subset of local training data, where the UE 605 left off.

As shown by reference number 650, the UE 605 may transmit, and the base station 615 may receive, a data transfer completion indication. The data transfer completion indication may indicate, to the base station 615, that the UE 605 has completed its transfer of the first subset of local training data to the UE 610.

As shown by reference number 655, the UE 610 may determine a combined local update. In some aspects, the UE 610 may determine the combined local update by combining a first local update and a second local update. For example, in some aspects, the UE 610 may determine a first local update associated with the machine learning component based at least in part on the first subset of local training data (e.g., training data collected by the UE 605). The UE 610 may determine a second local update associated with the machine learning component based at least in part on a second set of local training data (e.g., local training data collected by the UE 610). In some aspects, for example, the UE 610 may determine the first and/or second local updates by using a process similar to that described above in connection with FIG. 5. The first and/or second local updates may include at least one gradient of a respective loss function associated with the machine learning component.

The UE 610 may determine the combined local update by combining the first local update and the second local update. The UE 610 may combine the local updates by averaging the first local update with the second local update, summing the first local update and the second local update, and/or including the first local update with the second local update in a communication, among other examples. In some aspects, the first subset of local training data and/or the first local update may include first encrypted and/or compressed information (e.g., encrypted and/or compressed training data, encrypted and/or compressed gradients), and the UE 610 may encrypt the second set of local training data and/or the second local update information to generate second encrypted information. The UE 610 may combine the encrypted and/or compressed first information with the encrypted and/or compressed second local update information to generate the combined local update. In some aspects, the UE 610 may combine encrypted and/or compressed first information with second information that has not been encrypted and/or compressed to generate the combined local update.

In some aspects, the first local update may include an additional local update and/or combined local update (e.g., a combination of a local update associated with the UE 605 and another local update associated with another UE), and the UE 610 may determine the combined update by combining the additional combined local update and the second local update. In some aspects, the UE 610 may combine any number of other local updates. In some aspects, the UE 610 may determine the combined local update by training the machine learning component based at least in part on a combined local training data set that includes the first subset of local training data and the second set of local training data.

In some aspects, the sidelink communication may include a first local update (e.g., a set of gradients, as described above) determined by the UE 605. The UE 610 may determine a second local update based at least in part on the second set of local training data (e.g., the local training data collected by the UE 610). The UE 610 may determine the combined local update by combining the first local update with the second local update. In some aspects, the UE 610 may combine the first local update with the second local update by averaging the first local update with the second local update, summing the first local update and the second local update, and/or including the first local update with the second local update in a communication, among other examples.

For example, in some aspects, the UE 610 may determine a weighted sum of the gradients corresponding to the first local update and the gradients corresponding to the second local update. The weights used in the weighted sum may be selected to reflect a quality of the corresponding gradients. For example, each gradient may be weighted based at least in part on a number of data points in the local training data set used to determine the gradient and/or a number of local iterations of a computation used to train the machine learning component to determine the gradient, among other examples.

As shown by reference number 660, the UE 610 may transmit, and the base station 615 may receive, the combined local update.

As indicated above, FIG. 6 is provided merely as an example. Other examples may differ from what is described with regard to FIG. 6.

Figure 7:
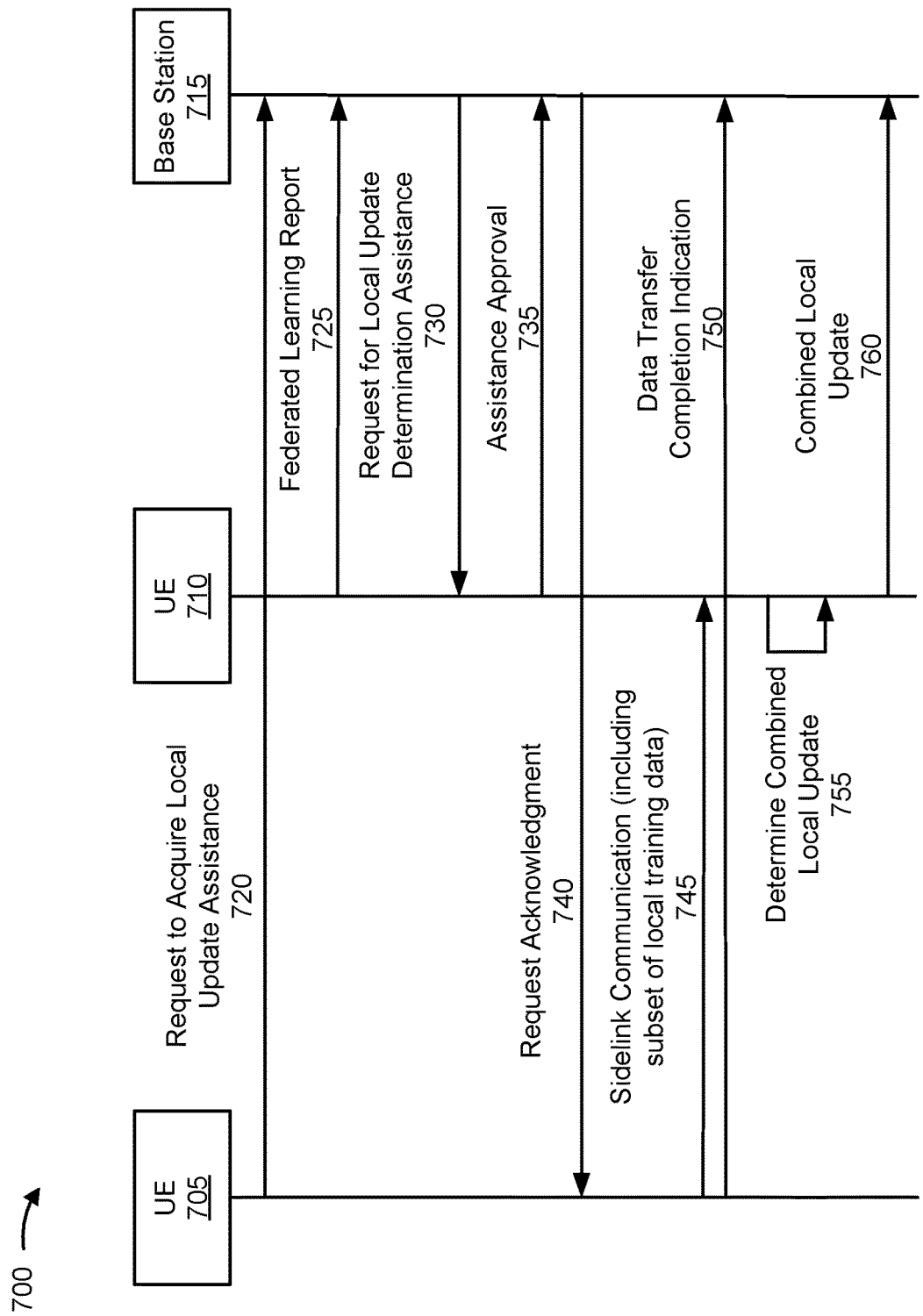

FIG. 7 is a diagram illustrating an example 700 associated with sidelink-supported federated learning for training a machine learning component, in accordance with the present disclosure. As shown, a UE 705, a UE 710, and a base station 715 may communicate with one another. In some aspects, the UE 705 and/or the UE 710 may be, be similar to, include, or be included in one or more of the UEs 510 shown in FIG. 5 and/or the UEs 605 and 610 shown in FIG. 6. In some aspects, the base station 715 may be, be similar to, include, or be included in the base station 505 shown in FIG. 5 and/or the base station 615 shown in FIG. 6. In some aspects, the UEs 705 and 710 may communicate with one another via a sidelink connection. The UEs 705 and/or 710 may communicate with the base station 715 via an access link. While the example 600 shown in FIG. 6 depicted a sidelink-supported procedure being initiated by the base station 615, the example 700 depicts a sidelink supported procedure being initiated by the UE 705.

As shown by reference number 720, the UE 705 may transmit, and the base station 715 may receive, a request to acquire local update assistance. In some aspects, for example, the UE 705 may determine that the UE 705 does not have enough processing capacity, power capacity, and/or memory to determine a local update, to determine a local update within a specified amount of time, and/or to determine a local update in accordance with some other specified criterion. In some aspects, the UE 705 may have started training the machine learning component and may determine that the UE 705 is not making progress fast enough. Based at least in part on one of more of these determinations, the UE 705 may determine that the UE 705 should transfer its local training data to another UE that is capable of performing the training to determine a corresponding local update within the specified performance criteria.

As shown by reference number 725, the UE 710 may transmit, and the base station 715 may receive, a federated learning report. The federated learning report may indicate one or more parameters associated with federated learning that correspond to the UE 710. For example, in some aspects, the federated learning report transmitted by the UE 710 may indicate at least one of a UE capability of the UE 710, a training progress associated with training the machine learning component, and/or a power status of the UE 710, among other examples.

As shown by reference 730, the base station 715 may transmit, to the UE 710, a request for local update assistance. In some aspects, the base station 715 may select the UE 710 from among a set of participating UEs. The set of participating UEs may include one or more UEs that are participating in a federated learning round or rounds. The base station 715 may select the UE 710 based at least in part on the federated learning report received from the UE 710. For example, the base station 715 may select the UE 710 based at least in part on determining that the UE 710 includes enough processing capacity, capability, memory, and/or power to determine a combined local update in a manner that satisfies the specified performance criteria. In some aspects, the base station 715 may determine that the UE 710 also has a sidelink status that satisfies one or more criteria associated with sidelink status. For example, the one or more criteria may correspond to connection to a sidelink network, an ability to connect to a sidelink network, and/or availability of sidelink resources that may be allocated to a particular UE and/or transmission, among other examples.

As shown by reference number 735, the UE 710 may transmit, and the base station 715 may receive, an assistance approval. In some aspects, the assistance approval may be indicated using a HARQ ACK transmission. In some aspects, the assistance approval may be indicated using UCI, a MAC CE, and/or any other type of signaling available for transmitting the approval to the base station 715.

As shown by reference number 740, the base station 715 may transmit, and the UE 705 may receive, a request acknowledgment. The base station 715 may transmit the request acknowledgment based at least in part on receiving the assistance approval from the UE 710. In some aspects, the base station 715 may be unable to identify a receiving UE to assist the UE 705 with determination of local updates. In this case, the base station 715 may indicate to the UE 705 that the base station 715 will provide the assistance.

As shown by reference number 745, the UE 705 may transmit, and the UE 710 may receive, a sidelink communication. The sidelink communication may be transmitted based at least in part on the sidelink configuration and/or sidelink resource reservation. In some aspects, the sidelink communication may be carried on at least one of a PSCCH, a PSSCH, or a combination thereof. The sidelink communication may indicate a first subset of local training data of a set of local training data associated with the UE 705. In some aspects, the sidelink communication may indicate an encrypted first subset of local training data.

In some aspects, the sidelink communication may indicate a set of intermediate results of a local update determination generated by the UE 705. The sidelink communication may indicate a number of training iterations corresponding to the set of intermediate results. In this way, the UE 710 may be able to finish training the machine learning component by starting, with respect to the first subset of local training data, where the UE 705 left off.

As shown by reference number 750, the UE 705 may transmit, and the base station 715 may receive, a data transfer completion indication. The data transfer completion indication may indicate, to the base station 715, that the UE 705 has completed its transfer of the first subset of local training data to the UE 710.

As shown by reference number 755, the UE 710 may determine a combined local update. In some aspects, the UE 710 may determine the combined local update by combining a first local update and a second local update, for example, as described above in connection with FIG. 6. As shown by reference number 760, the UE 710 may transmit, and the base station 715 may receive, the combined local update.

As indicated above, FIG. 7 is provided merely as an example. Other examples may differ from what is described with regard to FIG. 7.

Figure 8:
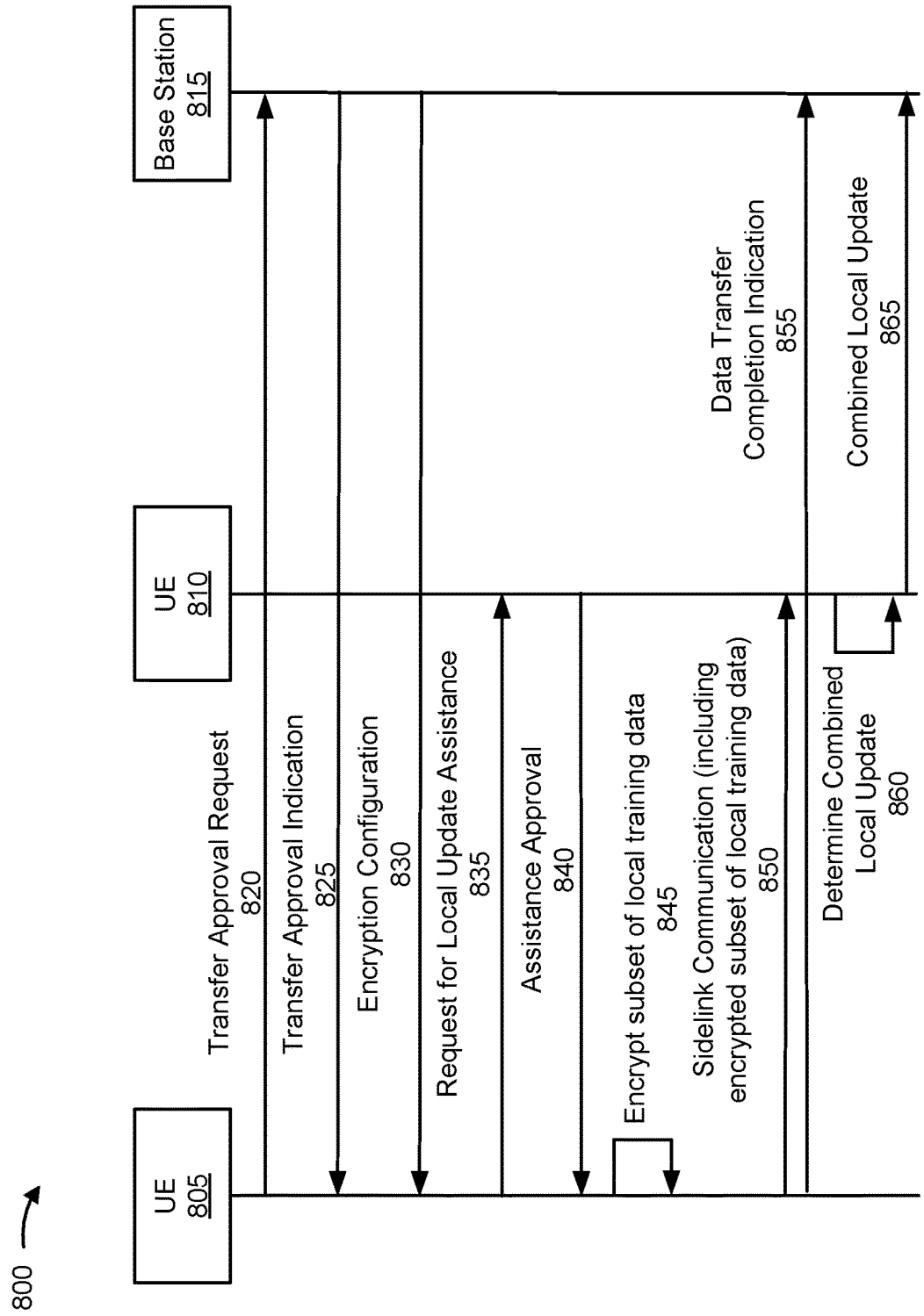

FIG. 8 is a diagram illustrating an example 800 associated with sidelink-supported federated learning for training a machine learning component, in accordance with the present disclosure. As shown, a UE 805, a UE 810, and a base station 815 may communicate with one another. In some aspects, the UE 805 and/or the UE 810 may be, be similar to, include, or be included in one or more of the UEs 510 shown in FIG. 5, UEs 605 and 610 shown in FIG. 6, and/or UEs 705 and 710 shown in FIG. 7. In some aspects, the base station 815 may be, be similar to, include, or be included in the base station 505 shown in FIG. 5, the base station 615 shown in FIG. 6, and/or the base station 715 shown in FIG. 7. In some aspects, the UEs 805 and 810 may communicate with one another via a sidelink connection. The UEs 805 and/or 810 may communicate with the base station 815 via an access link. The example 800 depicts a sidelink supported procedure being initiated by the UE 805.

As shown by reference number 820, the UE 805 may transmit, and the base station 815 may receive, a transfer approval request. The transfer approval request may be a request to the base station 815 to determine whether the UE 805 may transfer local training data to another UE (e.g., UE 810) without risking a violation of data privacy criteria with respect to the local training data that the UE 805 proposes to transfer.

As shown by reference number 825, the base station 815 may transmit, and the UE 805 may receive, a transfer approval indication. For example, in some aspects, the base station 815 may determine, based at least in part on a federated learning report received from the UE 810 and/or other information available about the UE 810, that transferring local training data to the UE 810 would not risk a violation of privacy criteria associated with the local training data.

In some aspects, the base station 815 may transmit the transfer approval indication based at least in part on a determination that the transfer of local training data would involve encryption. As shown by reference number 830, for example, the base station 815 may transmit, and the UE 805 may receive, an encryption configuration. The encryption configuration may indicate an encryption algorithm, one or more parameters associated with an encryption algorithm, an encryption scheme involving multiple encryption algorithms, and/or one or more parameters associated with an encryption scheme, among other examples.

As shown by reference number 835, the UE 805 may transmit, and the UE 810 may receive, a request for local update assistance. In some aspects, the UE 805 may identify the UE 810 based at least in part on an indication of the UE 810 received from the base station 815, a UE participant list received from the base station 815, and/or an evaluation of a sidelink network to identify available UEs and/or sidelink resources, among other examples. As shown by reference number 840, the UE 810 may transmit, and the UE 805 may receive assistance approval.

As shown by reference number 845, the UE 805 may encrypt a first subset of local training data to generate a set of encrypted data. In some aspects, the UE 805 may encrypt the first subset of local training data based at least in part on the encryption configuration received from the base station 815. In some aspects, the encryption may be configured so that the federated learning procedure is invariant to the encryption parameters and/or algorithms. For example, training the machine learning component using the encrypted data may result in a local update that is the same as, or can be processed similarly to, a local update determined using local training data that is not encrypted.

As shown by reference number 850, the UE 805 may transmit, and the UE 810 may receive, a sidelink communication. The sidelink communication may be transmitted based at least in part on a sidelink configuration and/or sidelink resource reservation. In some aspects, the sidelink communication may be carried on at least one of a PSCCH, a PSSCH, or a combination thereof. The sidelink communication may indicate set of encrypted data created by encrypting the first subset of local training data of a set of local training data associated with the UE 805.

In some aspects, the sidelink communication may indicate a set of intermediate results of a local update determination generated by the UE 805. The sidelink communication may indicate a number of training iterations corresponding to the set of intermediate results. In this way, the UE 810 may be able to finish training the machine learning component by starting, with respect to the first subset of local training data, where the UE 805 left off.

As shown by reference number 855, the UE 805 may transmit, and the base station 815 may receive, a data transfer completion indication. The data transfer completion indication may indicate, to the base station 815, that the UE 805 has completed its transfer of the set of encrypted data to the UE 810.

As shown by reference number 860, the UE 810 may determine a combined local update. In some aspects, the UE 810 may determine the combined local update by combining a first local update and a second local update, for example, as described above in connection with FIG. 6. As shown by reference number 865, the UE 810 may transmit, and the base station 815 may receive, the combined local update.

As indicated above, FIG. 8 is provided merely as an example. Other examples may differ from what is described with regard to FIG. 8.

Figure 9:
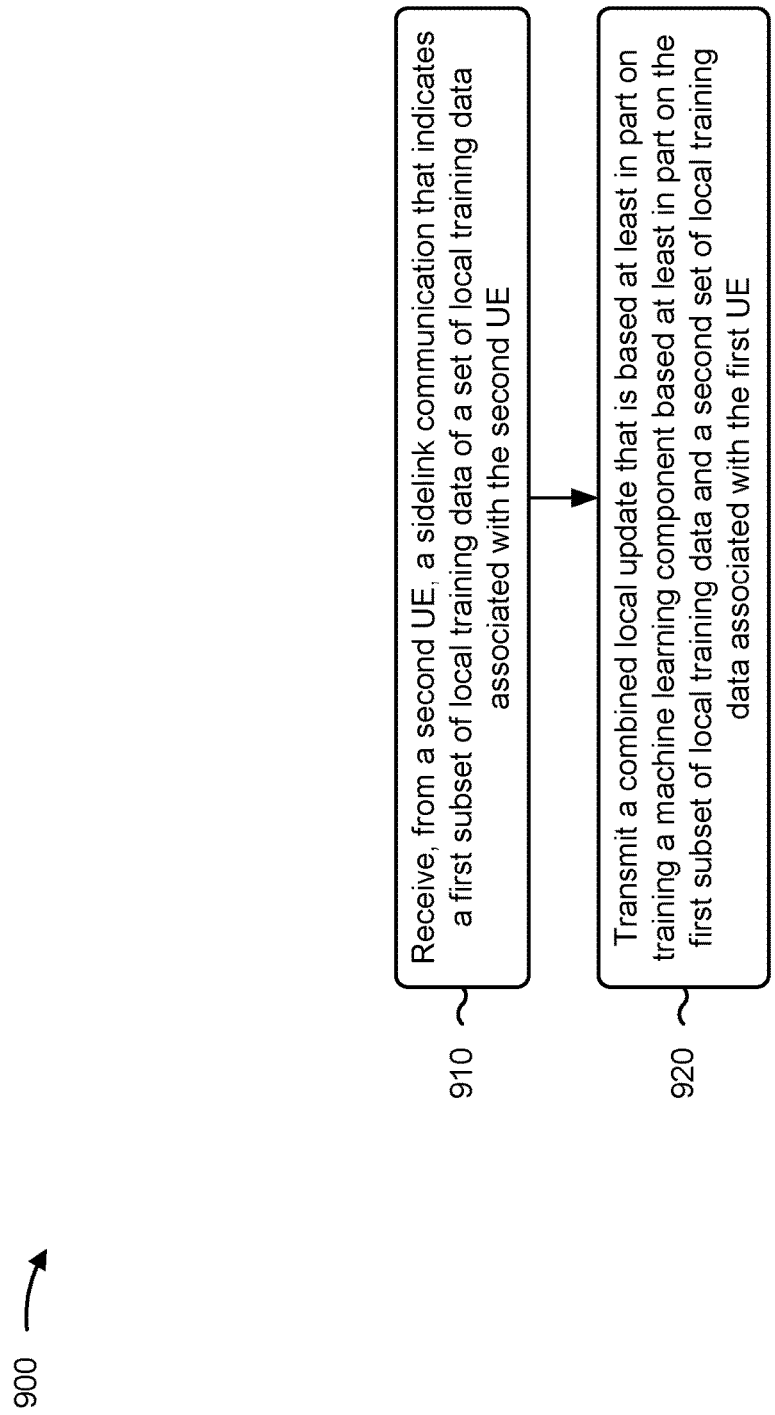
FIGS. 9-12 are diagrams illustrating example processes associated with sidelink-supported federated learning for training a machine learning component, in accordance with the present disclosure.

FIG. 9 is a diagram illustrating an example process 900 performed, for example, by a first UE, in accordance with various aspects of the present disclosure. Example process 900 is an example where the UE (e.g., UE 610, UE 710, and/or UE 810) performs operations associated with sidelink-supported federated learning for training a machine learning component.

As shown in FIG. 9, in some aspects, process 900 may include receiving, from a second UE, a sidelink communication that indicates a first subset of local training data of a set of local training data associated with the second UE (block 910). For example, the UE (e.g., using reception component 1302, depicted in FIG. 13) may receive, from a second UE, a sidelink communication that indicates a first subset of local training data of a set of local training data associated with the second UE, as described above.

As further shown in FIG. 9, in some aspects, process 900 may include transmitting a combined local update that is based at least in part on training a machine learning component based at least in part on the first subset of local training data and a second set of local training data associated with the first UE (block 920). For example, the UE (e.g., using transmission component 1304, depicted in FIG. 13) may transmit a combined local update that is based at least in part on training a machine learning component based at least in part on the first subset of local training data and a second set of local training data associated with the first UE, as described above.

Process 900 may include additional aspects, such as any single aspect or any combination of aspects described below and/or in connection with one or more other processes described elsewhere herein.

In a first aspect, the combined local update comprises a set of gradients of a loss function associated with the machine learning component.

In a second aspect, alone or in combination with the first aspect, the sidelink communication further indicates a set of intermediate results of a local update determination generated by the second UE.

In a third aspect, alone or in combination with one or more of the first and second aspects, the sidelink communication further indicates a number of training iterations corresponding to the set of intermediate results.

In a fourth aspect, alone or in combination with one or more of the first through third aspects, process 900 includes determining the combined local update by training the machine learning component based at least in part on a combined local training data set that includes the first subset of local training data and the second set of local training data.

In a fifth aspect, alone or in combination with one or more of the first through fourth aspects, process 900 includes determining a first local update by training the machine learning component based at least in part on the first subset of local training data, determining a second local update by training the machine learning component based at least in part on the second set of local training data, and determining the combined local update based at least in part on combining the first local update with the second local update.

In a sixth aspect, alone or in combination with one or more of the first through fifth aspects, receiving the sidelink communication comprises receiving the sidelink communication based at least in part on a determination of base station approval associated with a transmission of the first subset of local training data.

In a seventh aspect, alone or in combination with one or more of the first through sixth aspects, the sidelink communication comprises a set of encrypted data indicating the first subset of local training data.

In an eighth aspect, alone or in combination with one or more of the first through seventh aspects, process 900 includes determining the combined local update based at least in part on the set of encrypted data, without decrypting the encrypted data.

In a ninth aspect, alone or in combination with one or more of the first through eighth aspects, process 900 includes transmitting, to a base station, a federated learning report that indicates one or more parameters associated with federated learning.

In a tenth aspect, alone or in combination with one or more of the first through ninth aspects, process 900 includes receiving a request for local update assistance, and transmitting an assistance approval, wherein receiving the sidelink communication comprises receiving the sidelink communication based at least in part on transmitting the assistance approval.

In an eleventh aspect, alone or in combination with one or more of the first through tenth aspects, receiving the request comprises receiving the request from a base station.

In a twelfth aspect, alone or in combination with one or more of the first through eleventh aspects, receiving the request comprises receiving the request from the second UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:

FIG. 10 is a diagram illustrating an example process 1000 performed, for example, by a UE, in accordance with various aspects of the present disclosure. Example process 1000 is an example where the UE (e.g., UE 605, UE 705, and/or UE 805) performs operations associated with sidelink-supported federated learning for training a machine learning component.

As shown in FIG. 10, in some aspects, process 1000 may include receiving a machine learning component (block 1010). For example, the UE (e.g., using reception component 1302, depicted in FIG. 13) may receive a machine learning component, as described above.

As further shown in FIG. 10, in some aspects, process 1000 may include transmitting, to a second UE, a sidelink communication that indicates a first subset of local training data of a set of local training data associated with the first UE (block 1020). For example, the UE (e.g., using transmission component 1304, depicted in FIG. 13) may transmit, to a second UE, a sidelink communication that indicates a first subset of local training data of a set of local training data associated with the first UE, as described above.

Process 1000 may include additional aspects, such as any single aspect or any combination of aspects described below and/or in connection with one or more other processes described elsewhere herein.

In a first aspect, the sidelink communication further indicates a set of intermediate results of a local update determination generated by the first UE.

In a second aspect, alone or in combination with the first aspect, the sidelink communication further indicates a number of training iterations corresponding to the set of intermediate results.

In a third aspect, alone or in combination with one or more of the first and second aspects, process 1000 includes receiving, from a base station, an indication of a base station approval associated with a transmission of the first subset of local training data.

In a fourth aspect, alone or in combination with one or more of the first through third aspects, process 1000 includes encrypting the first subset of local training data to generate a set of encrypted data, wherein the sidelink communication comprises a set of encrypted data indicating the first subset of local training data.

In a fifth aspect, alone or in combination with one or more of the first through fourth aspects, process 1000 includes receiving, from a base station, an encryption configuration, wherein encrypting the first subset of local training data comprises encrypting the first subset of local training data based at least in part on the encryption configuration.

In a sixth aspect, alone or in combination with one or more of the first through fifth aspects, process 1000 includes transmitting, to a base station, a federated learning report that indicates one or more parameters associated with federated learning, and receiving, from the base station and based at least in part on the federated learning report, a request to acquire local update assistance.

In a seventh aspect, alone or in combination with one or more of the first through sixth aspects, the federated learning report indicates at least one of a UE capability of the first UE, a training progress associated with training the machine learning component, a power status of the first UE, or a sidelink status of the first UE.

In an eighth aspect, alone or in combination with one or more of the first through seventh aspects, process 1000 includes receiving, from a base station, a request for the first UE to establish a sidelink connection with the second UE.

In a ninth aspect, alone or in combination with one or more of the first through eighth aspects, process 1000 includes receiving, from a base station, a sidelink configuration that indicates one or more sidelink resources to be used for the sidelink communication.

In a tenth aspect, alone or in combination with one or more of the first through ninth aspects, the one or more sidelink resources comprise at least one of a periodic resource or a semi-persistent resource.

In an eleventh aspect, alone or in combination with one or more of the first through tenth aspects, process 1000 includes transmitting, to a base station, a data transfer completion indication.

In a twelfth aspect, alone or in combination with one or more of the first through eleventh aspects, process 1000 includes transmitting, to a base station, a request to acquire local update assistance.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
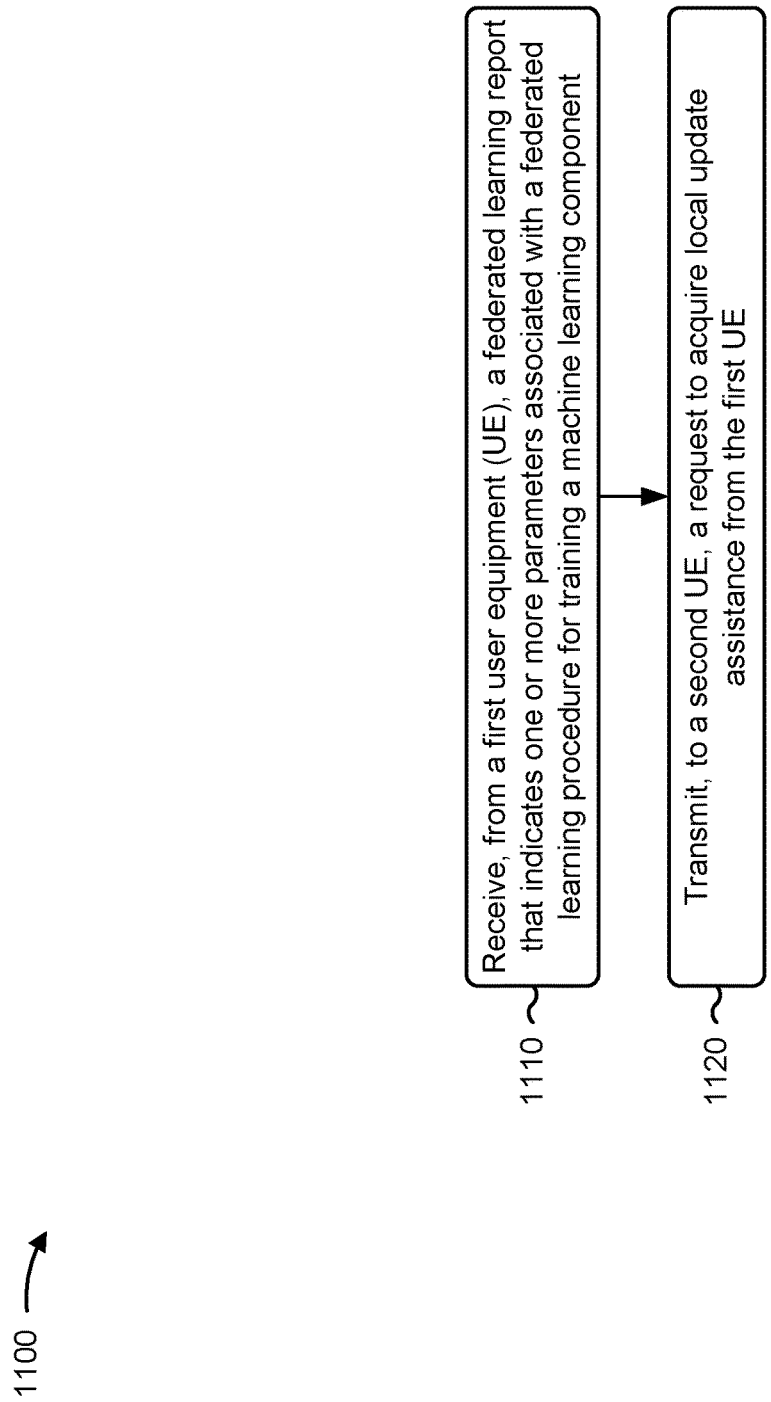

FIG. 11 is a diagram illustrating an example process 1100 performed, for example, by a base station, in accordance with various aspects of the present disclosure. Example process 1100 is an example where the base station (e.g., base station 615, 715, and/or 815) performs operations associated with sidelink-supported federated learning for training a machine learning component.

As shown in FIG. 11, in some aspects, process 1100 may include receiving, from a first UE, a federated learning report that indicates one or more parameters associated with a federated learning procedure for training a machine learning component (block 1110). For example, the base station (e.g., using reception component 1402, depicted in FIG. 14) may receive, from a first UE, a federated learning report that indicates one or more parameters associated with a federated learning procedure for training a machine learning component, as described above.

As further shown in FIG. 11, in some aspects, process 1100 may include transmitting, to a second UE, a request to acquire local update assistance from the first UE (block 1120). For example, the base station (e.g., using transmission component 1404, depicted in FIG. 14) may transmit, to a second UE, a request to acquire local update assistance from the first UE, as described above.

Process 1100 may include additional aspects, such as any single aspect or any combination of aspects described below and/or in connection with one or more other processes described elsewhere herein.

In a first aspect, process 1100 includes transmitting, to the first UE, a request for local update assistance.

In a second aspect, alone or in combination with the first aspect, process 1100 includes receiving, from the second UE, an assistance approval.

In a third aspect, alone or in combination with one or more of the first and second aspects, process 1100 includes receiving, from the first UE, a combined local update that is based at least in part on a first subset of local training data associated with the second UE and a second set of local training data associated with the first UE.

In a fourth aspect, alone or in combination with one or more of the first through third aspects, the combined local update comprises a set of gradients of a loss function associated with the machine learning component.

In a fifth aspect, alone or in combination with one or more of the first through fourth aspects, process 1100 includes transmitting, to the second UE, a sidelink configuration that indicates one or more sidelink resources to be used for a sidelink communication that indicates a first subset of local training data of a set of local training data associated with the second UE.

In a sixth aspect, alone or in combination with one or more of the first through fifth aspects, the one or more sidelink resources comprise at least one of a periodic resource or a semi-persistent resource.

In a seventh aspect, alone or in combination with one or more of the first through sixth aspects, process 1100 includes receiving, from the second UE, a data transfer completion indication.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
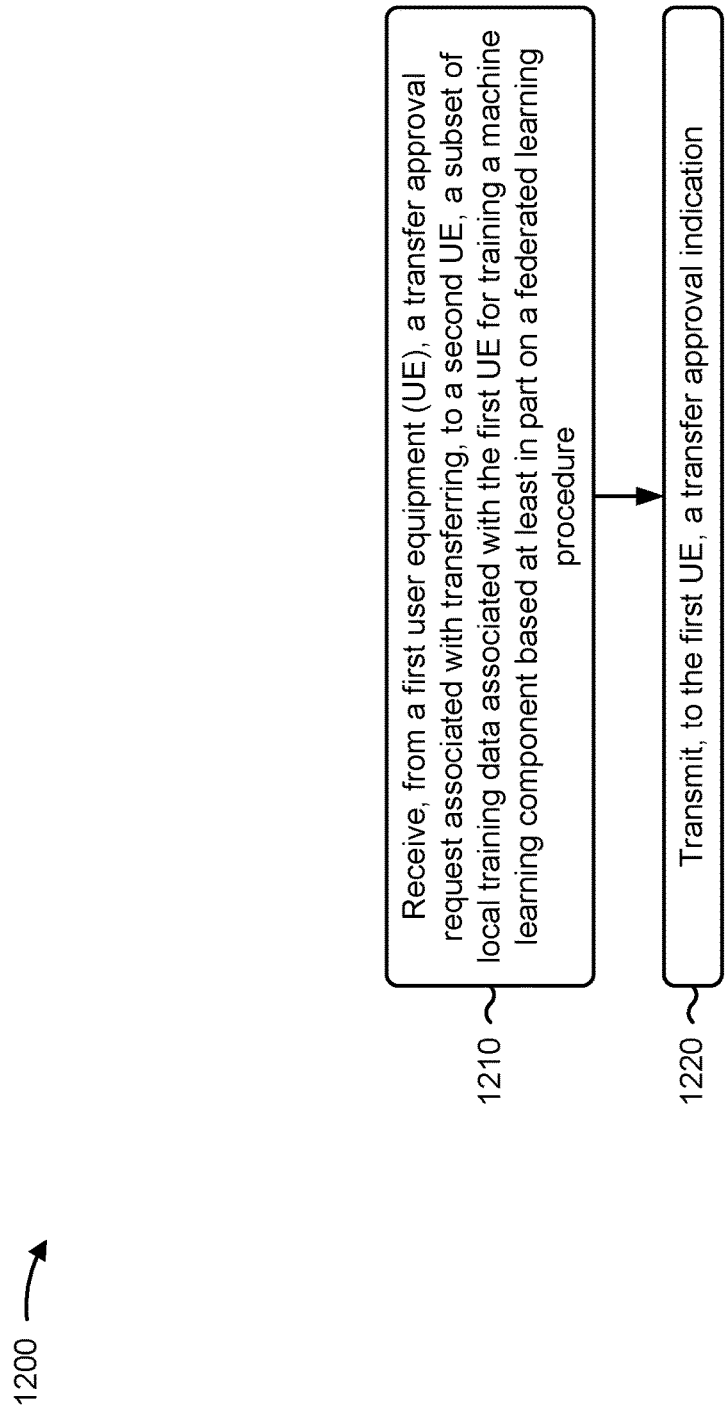

FIG. 12 is a diagram illustrating an example process 1200 performed, for example, by a base station, in accordance with various aspects of the present disclosure. Example process 1200 is an example where the base station (e.g., base station 615, 715, and/or 815) performs operations associated with sidelink-supported federated learning for training a machine learning component.

As shown in FIG. 12, in some aspects, process 1200 may include receiving, from a first UE, a transfer approval request associated with transferring, to a second UE, a subset of local training data associated with the first UE for training a machine learning component based at least in part on a federated learning procedure (block 1210). For example, the base station (e.g., using reception component 1402, depicted in FIG. 14) may receive, from a first UE, a transfer approval request associated with transferring, to a second UE, a subset of local training data associated with the first UE for training a machine learning component based at least in part on a federated learning procedure, as described above.

As further shown in FIG. 12, in some aspects, process 1200 may include transmitting, to the first UE, a transfer approval indication (block 1220). For example, the base station (e.g., using transmission component 1404, depicted in FIG. 14) may transmit, to the first UE, a transfer approval indication, as described above.

Process 1200 may include additional aspects, such as any single aspect or any combination of aspects described below and/or in connection with one or more other processes described elsewhere herein.

In a first aspect, process 1200 includes transmitting, to the first UE, an encryption configuration.

In a second aspect, alone or in combination with the first aspect, process 1200 includes receiving, from the second UE, a federated learning report that indicates one or more parameters associated with a federated learning procedure for training a machine learning component, wherein transmitting the transfer approval indication comprises transmitting the transfer approval indication based at least in part on the federated learning report.

In a third aspect, alone or in combination with one or more of the first and second aspects, process 1200 includes receiving, from the second UE, a combined local update that is based at least in part on the subset of local training data associated with the first UE and an additional set of local training data associated with the second UE.

In a fourth aspect, alone or in combination with one or more of the first through third aspects, the combined local update comprises a set of gradients of a loss function associated with the machine learning component.

In a fifth aspect, alone or in combination with one or more of the first through fourth aspects, process 1200 includes transmitting, to the first UE, a sidelink configuration that indicates one or more sidelink resources to be used for a sidelink communication that indicates the subset of local training data.

In a sixth aspect, alone or in combination with one or more of the first through fifth aspects, the one or more sidelink resources comprise at least one of a periodic resource or a semi-persistent resource.

In a seventh aspect, alone or in combination with one or more of the first through sixth aspects, process 1200 includes receiving, from the first UE, a data transfer completion indication.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
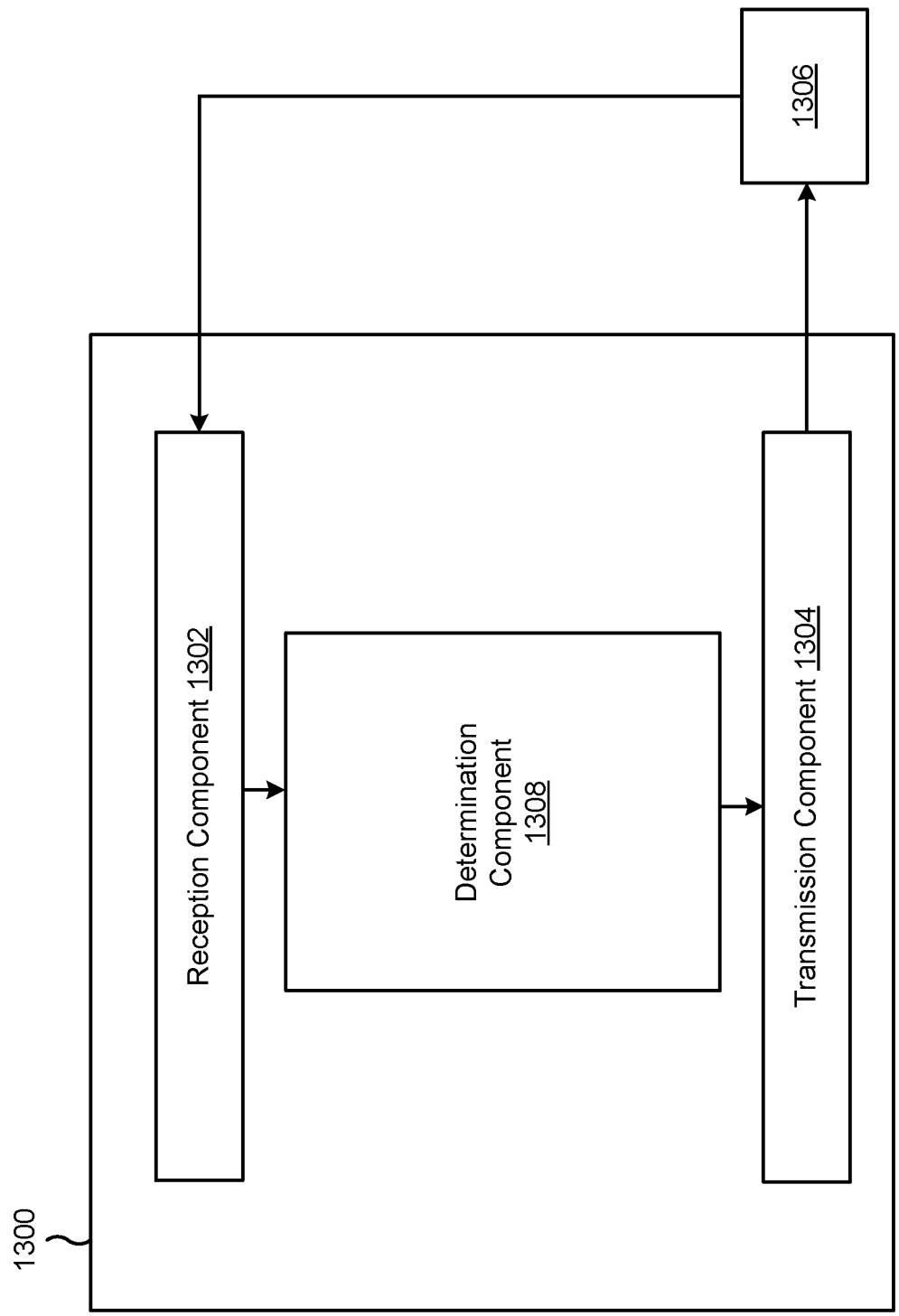
FIGS. 13 and 14 are block diagrams of example apparatuses for wireless communication, in accordance with the present disclosure.

FIG. 13 is a block diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a determination component 1308.

In some aspects, the apparatus 1300 may be configured to perform one or more operations described herein in connection with FIGS. 6-8. Additionally, or alternatively, the apparatus 1300 may be configured to perform one or more processes described herein, such as process 900 of FIG. 9, process 1000 of FIG. 10, or a combination thereof. In some aspects, the apparatus 1300 and/or one or more components shown in FIG. 13 may include one or more components of the UE described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the UE described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the UE described above in connection with FIG. 2. In some aspects, the transmission component 1304 may be co-located with the reception component 1302 in a transceiver.

The reception component 1302 may receive, from a second UE, a sidelink communication that indicates a first subset of local training data of a set of local training data associated with the second UE. The transmission component 1304 may transmit a combined local update that is based at least in part on training a machine learning component based at least in part on the first subset of local training data and a second set of local training data associated with the first UE.

The determination component 1308 may determine the combined local update by training the machine learning component based at least in part on a combined local training data set that includes the first subset of local training data and the second set of local training data. In some aspects, the determination component 1308 may include one or more antennas, a modulator, a transmit MIMO processor, a transmit processor, a controller/processor, a memory, or a combination thereof, of the UE described above in connection with FIG. 2. In some aspects, the determination component 1308 may include the reception component 1302 and/or the transmission component 1304.

The determination component 1308 may determine a first local update by training the machine learning component based at least in part on the first subset of local training data. The determination component 1308 may determine a second local update by training the machine learning component based at least in part on the second set of local training data. The determination component 1308 may determine the combined local update based at least in part on combining the first local update with the second local update. The determination component 1308 may determine the combined local update based at least in part on the set of encrypted data, without decrypting the encrypted data.

The transmission component 1304 may transmit, to a base station, a federated learning report that indicates one or more parameters associated with federated learning. The reception component 1302 may receive a request for local update assistance. The transmission component 1304 may transmit an assistance approval, wherein receiving the sidelink communication comprises receiving the sidelink communication based at least in part on transmitting the assistance approval.

The reception component 1302 may receive a machine learning component. The transmission component 1304 may transmit, to a second UE, a sidelink communication that indicates a first subset of local training data of a set of local training data associated with the first UE. The reception component 1302 may receive, from a base station, an indication of a base station approval associated with a transmission of the first subset of local training data.

The determination component 1308 and/or transmission component 1304 may encrypt the first subset of local training data to generate a set of encrypted data, wherein the sidelink communication comprises a set of encrypted data indicating the first subset of local training data. The reception component 1302 may receive, from a base station, an encryption configuration, wherein encrypting the first subset of local training data comprises encrypting the first subset of local training data based at least in part on the encryption configuration.

The transmission component 1304 may transmit, to a base station, a federated learning report that indicates one or more parameters associated with federated learning. The reception component 1302 may receive, from the base station and based at least in part on the federated learning report, a request to acquire local update assistance. The reception component 1302 may receive, from a base station, a request for the first UE to establish a sidelink connection with the second UE. The reception component 1302 may receive, from a base station, a sidelink configuration that indicates one or more sidelink resources to be used for the sidelink communication.

The transmission component 1304 may transmit, to a base station, a data transfer completion indication. The transmission component 1304 may transmit, to a base station, a request to acquire local update assistance.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
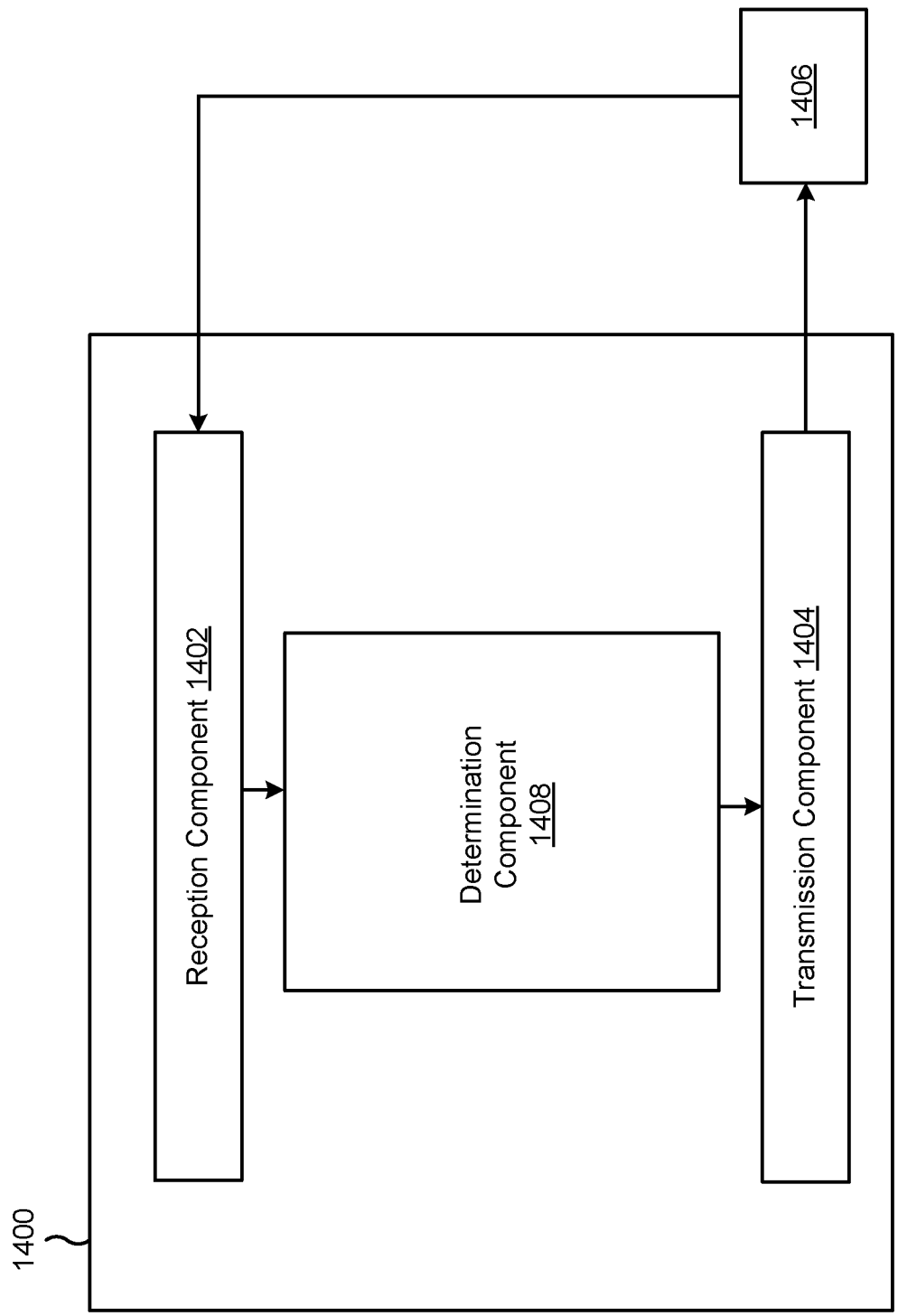

FIG. 14 is a block diagram of an example apparatus 1400 for wireless communication. The apparatus 1400 may be a base station, or a base station may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include a determination component 1408.

In some aspects, the apparatus 1400 may be configured to perform one or more operations described herein in connection with FIGS. 6-8. Additionally, or alternatively, the apparatus 1400 may be configured to perform one or more processes described herein, such as process 1100 of FIG. 11, process 1200 of FIG. 12, or a combination thereof. In some aspects, the apparatus 1400 and/or one or more components shown in FIG. 14 may include one or more components of the base station described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the base station described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the base station described above in connection with FIG. 2. In some aspects, the transmission component 1404 may be co-located with the reception component 1402 in a transceiver.

The reception component 1402 may receive, from a first UE, a federated learning report that indicates one or more parameters associated with a federated learning procedure for training a machine learning component. The transmission component 1404 may transmit, to a second UE, a request to acquire local update assistance from the first UE. The transmission component 1404 may transmit, to the first UE, a request for local update assistance.

The reception component 1402 may receive, from a first UE, a transfer approval request associated with transferring, to a second UE, a subset of local training data associated with the first UE for training a machine learning component based at least in part on a federated learning procedure. The transmission component 1404 may transmit, to the first UE, a transfer approval indication. The transmission component 1404 may transmit, to the first UE, an encryption configuration.

The determination component 1408 may determine whether a UE is capable of determining a local update in accordance with one or more specified performance criteria, determine whether a UE is capable of transmitting and/or receiving a sidelink communication, determine whether privacy of data may be maintained during a transfer of the data from one UE to another UE, determine global updates to a machine learning component, and/or configure a federated learning procedure, among other examples. In some aspects, the determination component 1408 may include one or more antennas, a modulator, a transmit MIMO processor, a transmit processor, a controller/processor, a memory, or a combination thereof, of the base station described above in connection with FIG. 2. In some aspects, the determination component 1408 may include the reception component 1402 and/or the transmission component 1404.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some aspects of the present disclosure:

Aspect 1: A method of wireless communication performed by a first user equipment (UE), comprising: receiving, from a second UE, a sidelink communication that indicates a first subset of local training data of a set of local training data associated with the second UE; and transmitting a combined local update that is based at least in part on training a machine learning component based at least in part on the first subset of local training data and a second set of local training data associated with the first UE.

Aspect 2: The method of aspect 1, wherein the combined local update comprises a set of gradients of a loss function associated with the machine learning component.

Aspect 3: The method of either of aspects 1 or 2, wherein the sidelink communication further indicates a set of intermediate results of a local update determination generated by the second UE.

Aspect 4: The method of aspect 3, wherein the sidelink communication further indicates a number of training iterations corresponding to the set of intermediate results.

Aspect 5: The method of any of aspect 1-4, further comprising determining the combined local update by training the machine learning component based at least in part on a combined local training data set that includes the first subset of local training data and the second set of local training data.

Aspect 6: The method of any of aspect 1-5, further comprising: determining a first local update by training the machine learning component based at least in part on the first subset of local training data; determining a second local update by training the machine learning component based at least in part on the second set of local training data; and determining the combined local update based at least in part on combining the first local update with the second local update.

Aspect 7: The method of any of aspect 1-6, wherein receiving the sidelink communication comprises receiving the sidelink communication based at least in part on a determination of base station approval associated with a transmission of the first subset of local training data.

Aspect 8: The method of any of aspect 1-7, wherein the sidelink communication comprises a set of encrypted data indicating the first subset of local training data.

Aspect 9: The method of aspect 8, further comprising determining the combined local update based at least in part on the set of encrypted data, without decrypting the encrypted data.

Aspect 10: The method of any of aspect 1-9, further comprising: transmitting, to a base station, a federated learning report that indicates one or more parameters associated with federated learning.

Aspect 11: The method of any of aspect 1-10, further comprising: receiving a request for local update assistance; and transmitting an assistance approval, wherein receiving the sidelink communication comprises receiving the sidelink communication based at least in part on transmitting the assistance approval.

Aspect 12: The method of aspect 11, wherein receiving the request comprises receiving the request from a base station.

Aspect 13: The method of aspect 11, wherein receiving the request comprises receiving the request from the second UE.

Aspect 14: A method of wireless communication performed by a first user equipment (UE), comprising: receiving a machine learning component; and transmitting, to a second UE, a sidelink communication that indicates a first subset of local training data of a set of local training data associated with the first UE.

Aspect 15: The method of aspect 14, wherein the sidelink communication further indicates a set of intermediate results of a local update determination generated by the first UE.

Aspect 16: The method of aspect 15, wherein the sidelink communication further indicates a number of training iterations corresponding to the set of intermediate results.

Aspect 17: The method of any of aspect 14-16, further comprising receiving, from a base station, an indication of a base station approval associated with a transmission of the first subset of local training data.

Aspect 18: The method of any of aspect 14-17, further comprising encrypting the first subset of local training data to generate a set of encrypted data, wherein the sidelink communication comprises a set of encrypted data indicating the first subset of local training data.

Aspect 19: The method of aspect 18, further comprising receiving, from a base station, an encryption configuration, wherein encrypting the first subset of local training data comprises encrypting the first subset of local training data based at least in part on the encryption configuration.

Aspect 20: The method of any of aspect 14-19, further comprising: transmitting, to a base station, a federated learning report that indicates one or more parameters associated with federated learning; and receiving, from the base station and based at least in part on the federated learning report, a request to acquire local update assistance.

Aspect 21: The method of aspect 20, wherein the federated learning report indicates at least one of: a UE capability of the first UE, a training progress associated with training the machine learning component, a power status of the first UE, or a sidelink status of the first UE.

Aspect 22: The method of any of aspect 14-21, further comprising: receiving, from a base station, a request for the first UE to establish a sidelink connection with the second UE.

Aspect 23: The method of any of aspect 14-22, further comprising receiving, from a base station, a sidelink configuration that indicates one or more sidelink resources to be used for the sidelink communication.

Aspect 24: The method of aspect 23, wherein the one or more sidelink resources comprise at least one of a periodic resource or a semi-persistent resource.

Aspect 25: The method of any of aspect 14-24, further comprising transmitting, to a base station, a data transfer completion indication.

Aspect 26: The method of any of aspect 14-25, further comprising transmitting, to a base station, a request to acquire local update assistance.

Aspect 27: A method of wireless communication performed by a base station, comprising: receiving, from a first user equipment (UE), a federated learning report that indicates one or more parameters associated with a federated learning procedure for training a machine learning component; and transmitting, to a second UE, a request to acquire local update assistance from the first UE.

Aspect 28: The method of aspect 27, further comprising transmitting, to the first UE, a request for local update assistance.

Aspect 29: The method of aspect 28, further comprising receiving, from the second UE, an assistance approval.

Aspect 30: The method of any of aspect 27-29, further comprising receiving, from the first UE, a combined local update that is based at least in part on a first subset of local training data associated with the second UE and a second set of local training data associated with the first UE.

Aspect 31: The method of aspect 30, wherein the combined local update comprises a set of gradients of a loss function associated with the machine learning component.

Aspect 32: The method of any of aspect 27-31, further comprising transmitting, to the second UE, a sidelink configuration that indicates one or more sidelink resources to be used for a sidelink communication that indicates a first subset of local training data of a set of local training data associated with the second UE.

Aspect 33: The method of aspect 32, wherein the one or more sidelink resources comprise at least one of a periodic resource or a semi-persistent resource.

Aspect 34: The method of any of aspect 27-34, further comprising receiving, from the second UE, a data transfer completion indication.

Aspect 35: A method of wireless communication performed by a base station, comprising: receiving, from a first user equipment (UE), a transfer approval request associated with transferring, to a second UE, a subset of local training data associated with the first UE for training a machine learning component based at least in part on a federated learning procedure; and transmitting, to the first UE, a transfer approval indication.

Aspect 36: The method of aspect 35, further comprising transmitting, to the first UE, an encryption configuration.

Aspect 37: The method of either of aspects 35 or 36, further comprising receiving, from the second UE, a federated learning report that indicates one or more parameters associated with a federated learning procedure for training a machine learning component, wherein transmitting the transfer approval indication comprises transmitting the transfer approval indication based at least in part on the federated learning report.

Aspect 38: The method of any of aspect 35-37, further comprising receiving, from the second UE, a combined local update that is based at least in part on the subset of local training data associated with the first UE and an additional set of local training data associated with the second UE.

Aspect 39: The method of aspect 38, wherein the combined local update comprises a set of gradients of a loss function associated with the machine learning component.

Aspect 40: The method of any of aspect 35-39, further comprising transmitting, to the first UE, a sidelink configuration that indicates one or more sidelink resources to be used for a sidelink communication that indicates the subset of local training data.

Aspect 41: The method of aspect 40, wherein the one or more sidelink resources comprise at least one of a periodic resource or a semi-persistent resource.

Aspect 42: The method of aspect 35, further comprising receiving, from the first UE, a data transfer completion indication.

Aspect 43: An apparatus for wireless communication at a device, comprising a processor; memory coupled with the processor; and instructions stored in the memory and executable by the processor to cause the apparatus to perform the method of one or more aspects of aspects 1-13.

Aspect 44: A device for wireless communication, comprising a memory and one or more processors coupled to the memory, the memory and the one or more processors configured to perform the method of one or more aspects of aspects 1-13.

Aspect 45: An apparatus for wireless communication, comprising at least one means for performing the method of one or more aspects of aspects 1-13.

Aspect 46: A non-transitory computer-readable medium storing code for wireless communication, the code comprising instructions executable by a processor to perform the method of one or more aspects of aspects 1-13.

Aspect 47: A non-transitory computer-readable medium storing a set of instructions for wireless communication, the set of instructions comprising one or more instructions that, when executed by one or more processors of a device, cause the device to perform the method of one or more aspects of aspects 1-13.

Aspect 48: An apparatus for wireless communication at a device, comprising a processor; memory coupled with the processor; and instructions stored in the memory and executable by the processor to cause the apparatus to perform the method of one or more aspects of aspects 14-26.

Aspect 49: A device for wireless communication, comprising a memory and one or more processors coupled to the memory, the memory and the one or more processors configured to perform the method of one or more aspects of aspects 14-26.

Aspect 50: An apparatus for wireless communication, comprising at least one means for performing the method of one or more aspects of aspects 14-26.

Aspect 51: A non-transitory computer-readable medium storing code for wireless communication, the code comprising instructions executable by a processor to perform the method of one or more aspects of aspects 14-26.

Aspect 52: A non-transitory computer-readable medium storing a set of instructions for wireless communication, the set of instructions comprising one or more instructions that, when executed by one or more processors of a device, cause the device to perform the method of one or more aspects of aspects 14-26.

Aspect 53: An apparatus for wireless communication at a device, comprising a processor; memory coupled with the processor; and instructions stored in the memory and executable by the processor to cause the apparatus to perform the method of one or more aspects of aspects 27-34.

Aspect 54: A device for wireless communication, comprising a memory and one or more processors coupled to the memory, the memory and the one or more processors configured to perform the method of one or more aspects of aspects 27-34.

Aspect 55: An apparatus for wireless communication, comprising at least one means for performing the method of one or more aspects of aspects 27-34.

Aspect 56: A non-transitory computer-readable medium storing code for wireless communication, the code comprising instructions executable by a processor to perform the method of one or more aspects of aspects 27-34.

Aspect 57: A non-transitory computer-readable medium storing a set of instructions for wireless communication, the set of instructions comprising one or more instructions that, when executed by one or more processors of a device, cause the device to perform the method of one or more aspects of aspects 27-34.

Aspect 58: An apparatus for wireless communication at a device, comprising a processor; memory coupled with the processor; and instructions stored in the memory and executable by the processor to cause the apparatus to perform the method of one or more aspects of aspects 35-42.

Aspect 59: A device for wireless communication, comprising a memory and one or more processors coupled to the memory, the memory and the one or more processors configured to perform the method of one or more aspects of aspects 35-42.

Aspect 60: An apparatus for wireless communication, comprising at least one means for performing the method of one or more aspects of aspects 35-42.

Aspect 61: A non-transitory computer-readable medium storing code for wireless communication, the code comprising instructions executable by a processor to perform the method of one or more aspects of aspects 35-42.

Aspect 62: A non-transitory computer-readable medium storing a set of instructions for wireless communication, the set of instructions comprising one or more instructions that, when executed by one or more processors of a device, cause the device to perform the method of one or more aspects of aspects 35-42.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE) for wireless communication, comprising:
   one or more memories; and
   one or more processors coupled to the one or more memories, the one or more processors configured to:
   receive a request for local update assistance;
   receive, from a second UE and based at least in part on the request, a sidelink communication that indicates a first subset of local training data of a set of local training data associated with the second UE; and
   transmit a combined local update that is based at least in part on training a machine learning component based at least in part on the first subset of local training data and a second set of local training data associated with the first UE.

2. The first UE of claim 1, wherein the combined local update comprises a set of gradients of a loss function associated with the machine learning component.

3. The first UE of claim 1, wherein the sidelink communication further indicates a set of intermediate results of a local update determination generated by the second UE.

4. The first UE of claim 3, wherein the sidelink communication further indicates a number of training iterations corresponding to the set of intermediate results.

5. The first UE of claim 1, wherein the one or more processors are further configured to:
   determine the combined local update by training the machine learning component based at least in part on a combined local training data set that includes the first subset of local training data and the second set of local training data.

6. The first UE of claim 1, wherein the one or more processors are further configured to:
   determine a first local update by training the machine learning component based at least in part on the first subset of local training data;
   determine a second local update by training the machine learning component based at least in part on the second set of local training data; and
   determine the combined local update based at least in part on combining the first local update with the second local update.

7. The first UE of claim 1, wherein the memory and the one or more processors, when receiving the sidelink communication, are configured to:
   receive the sidelink communication based at least in part on a determination of base station approval associated with a transmission of the first subset of local training data.

8. The first UE of claim 1, wherein the sidelink communication comprises a set of encrypted data indicating the first subset of local training data.

9. The first UE of claim 8, wherein the one or more processors are further configured to:
   determine the combined local update based at least in part on the set of encrypted data, without decrypting the encrypted data.

10. The first UE of claim 1, wherein the one or more processors are further configured to:
    transmit, to a base station, a federated learning report that indicates one or more parameters associated with federated learning.

11. The first UE of claim 1, wherein the one or more processors are further configured to:
    transmit an assistance approval, wherein receiving the sidelink communication comprises receiving the sidelink communication based at least in part on transmitting the assistance approval.

12. The first UE of claim 1, wherein the one or more processors, when receiving the request, are configured to receive the request from a base station.

13. The first UE of claim 1, wherein the one or more processors, when receiving the request, are configured to receive the request from the second UE.

14. A first user equipment (UE) for wireless communication, comprising:
    one or more memories; and
    one or more processors coupled to the one or more memories, the one or more processors configured to:
    receive, from a base station, a machine learning component for local training using a set of local training data; and
    transmit, to a second UE, a sidelink communication that indicates a first subset of local training data of the set of local training data.

15. The first UE of claim 14, wherein the sidelink communication further indicates a set of intermediate results of a local update determination generated by the first UE.

16. The first UE of claim 15, wherein the sidelink communication further indicates a number of training iterations corresponding to the set of intermediate results.

17. The first UE of claim 14, wherein the one or more processors are further configured to:
    receive, from the base station, an indication of a base station approval associated with a transmission of the first subset of local training data.

18. The first UE of claim 14, wherein the one or more processors are further configured to:

encrypt the first subset of local training data to generate a set of encrypted data, wherein the sidelink communication comprises a set of encrypted data indicating the first subset of local training data.

19. The first UE of claim 18, wherein the one or more processors are further configured to:
receive, from the base station, an encryption configuration,
wherein the one or more processors, when encrypting the first subset of local training data, are configured to encrypt the first subset of local training data based at least in part on the encryption configuration.

20. The first UE of claim 14, wherein the one or more processors are further configured to:
transmit, to the base station, a federated learning report that indicates one or more parameters associated with federated learning; and
receive, from the base station and based at least in part on the federated learning report, a request to acquire local update assistance.

21. The first UE of claim 20, wherein the federated learning report indicates at least one of:
a UE capability of the first UE,
a training progress associated with training the machine learning component,
a power status of the first UE, or
a sidelink status of the first UE.

22. The first UE of claim 14, wherein the one or more processors are further configured to:
receive, from the base station, a request for the first UE to establish a sidelink connection with the second UE.

23. The first UE of claim 14, wherein the memory and the one or more processors are further configured to:
receive, from the base station, a sidelink configuration that indicates one or more sidelink resources to be used for the sidelink communication.

24. The first UE of claim 23, wherein the one or more sidelink resources comprise at least one of a periodic resource or a semi-persistent resource.

25. The first UE of claim 14, wherein the one or more processors are further configured to:
transmit, to the base station, a data transfer completion indication.

26. The first UE of claim 14, wherein the one or more processors are further configured to:
transmit, to the base station, a request to acquire local update assistance.

27. A base station for wireless communication, comprising:
one or more memories; and
one or more processors coupled to the one or more memories, the one or more processors configured to:
receive, from a first user equipment (UE), a federated learning report that indicates one or more parameters associated with a federated learning procedure for training a machine learning component;
transmit, to a second UE, a request to acquire local update assistance from the first UE; and
receive, from the second UE, an indication corresponding to a transfer of local training data to the first UE.

28. The base station of claim 27, wherein the one or more processors are further configured to:
transmit, to the first UE, a request for local update assistance based at least in part on the federated learning report.

29. A base station for wireless communication, comprising:
one or more memories; and
one or more processors coupled to the one or more memories, the one or more processors configured to:
receive, from a first user equipment (UE), a transfer approval request associated with transferring, to a second UE, a subset of local training data associated with the first UE for training a machine learning component based at least in part on a federated learning procedure; and
transmit, to the first UE, a transfer approval indication based at least in part on whether encryption is to be utilized for a transfer of the subset of local training data to the second UE.

30. The base station of claim 29, wherein the one or more processors are further configured to:
transmit, to the first UE, an encryption configuration.

* * * * *